United States Patent
Meganck et al.

(10) Patent No.: US 9,672,674 B2
(45) Date of Patent: Jun. 6, 2017

(54) SYSTEMS AND METHODS FOR SECURE LOCK SYSTEMS WITH REDUNDANT ACCESS CONTROL

(71) Applicant: ACSYS IP HOLDING INC., Beirut (LB)

(72) Inventors: David Meganck, Guang Dong (CN); Ahmad Fares, Beirut (LB); Karim Belhadia, Guang Dong (CN); Jean Mouradian, Guang Dong (CN)

(73) Assignee: Acsys IP Holding, Inc., Beirut (LB)

( * ) Notice: Subject to any disclaimer, the term of this patent is extended or adjusted under 35 U.S.C. 154(b) by 0 days.

(21) Appl. No.: 15/203,467

(22) Filed: Jul. 6, 2016

(65) Prior Publication Data

US 2017/0053467 A1    Feb. 23, 2017

Related U.S. Application Data

(60) Provisional application No. 62/189,195, filed on Jul. 6, 2015.

(51) Int. Cl.
*G07C 9/00* (2006.01)
*H04W 4/00* (2009.01)
(Continued)

(52) U.S. Cl.
CPC ........ *G07C 9/00309* (2013.01); *E05B 1/0061* (2013.01); *E05B 3/06* (2013.01);
(Continued)

(58) Field of Classification Search
CPC ............ G07C 9/00309; G07C 9/00571; G07C 9/00039; E05B 1/0061; E05B 3/06;
(Continued)

(56) References Cited

U.S. PATENT DOCUMENTS 5,367,295 A    11/1994    Gokcebay et al.
5,552,777 A    9/1996    Gokcebay et al.
(Continued)

FOREIGN PATENT DOCUMENTS

DE    102007058481    6/2009
EP    2085934    7/2013
(Continued)

OTHER PUBLICATIONS

ACSYS, Video, 2013, available at http://vimeo.com/63151180.
(Continued)

*Primary Examiner* — Ali Neyzari
(74) *Attorney, Agent, or Firm* — Bryan Cave LLP

(57) ABSTRACT

Systems and methods for providing secure locks having redundant access channels are disclosed. In some embodiments of the invention, the smart lock has a hardware processor, a power source, a cylinder, a button that forms a rose knob, and a rose protector. The rose knob and rose protector protect and conceal the hardware processor, the power source, and the cylinder. The rose protector forms an annular groove that slidably interlocks with the rose knob. The rose knob has a plurality of redundant access channels for receiving authentication information. The redundant access channels may include a biometric scanner for receiving biometric information, a passcode keypad for entering a token, or a wireless transceiver for receiving a token from a mobile device and transmitting a response to the mobile device. When the user cannot open the lock through the first redundant access channel, the smart lock is configured to allow access through a second access channel.

20 Claims, 30 Drawing Sheets

(51) Int. Cl.
*H04L 29/12* (2006.01)
*E05B 15/16* (2006.01)
*E05B 49/00* (2006.01)
*E05B 1/00* (2006.01)
*E05B 3/06* (2006.01)
*E05B 41/00* (2006.01)

(52) U.S. Cl.
CPC .......... *E05B 15/1614* (2013.01); *E05B 41/00* (2013.01); *E05B 49/00* (2013.01); *G07C 9/00039* (2013.01); *G07C 9/00071* (2013.01); *H04L 61/6054* (2013.01); *H04W 4/008* (2013.01)

(58) Field of Classification Search
CPC ...... E05B 15/1614; E05B 41/00; E05B 49/00; H04L 61/6054; H04W 4/008
USPC .................................................. 340/5.61, 5.7
See application file for complete search history.

(56) References Cited

U.S. PATENT DOCUMENTS

| | | | |
|---|---|---|---|
| 6,000,609 A | 12/1999 | Gokcebay et al. | |
| 6,331,812 B1 | 12/2001 | Dawalibi | |
| 6,334,347 B1 | 1/2002 | Iscla | |
| 6,359,547 B1 | 3/2002 | Denison et al. | |
| 6,384,709 B2 | 5/2002 | Mellen et al. | |
| 6,552,650 B1 | 4/2003 | Gokcebay et al. | |
| 6,927,670 B1 | 8/2005 | Gokcebay et al. | |
| 7,397,343 B1 | 7/2008 | Gokcebay et al. | |
| 7,653,945 B2 | 1/2010 | Serani et al. | |
| 7,747,286 B2 | 6/2010 | Conforti | |
| 7,880,584 B2 | 2/2011 | Larson et al. | |
| 8,225,629 B2 | 7/2012 | Zuraski et al. | |
| 8,368,507 B2 | 2/2013 | Conreux et al. | |
| 8,437,740 B2 | 5/2013 | Despain et al. | |
| 8,616,031 B2 | 12/2013 | Ullrich et al. | |
| 8,646,298 B2 | 2/2014 | Lessels | |
| 8,772,970 B2 | 7/2014 | Lambrou | |
| 8,797,138 B2* | 8/2014 | Myers | G07C 9/00571 340/5.7 |
| 2003/0179073 A1 | 9/2003 | Ghazarian | |
| 2009/0085717 A1 | 4/2009 | Kirkjan et al. | |
| 2010/0176919 A1 | 7/2010 | Myers et al. | |
| 2010/0201536 A1 | 8/2010 | Robertson et al. | |
| 2010/0265068 A1 | 10/2010 | Brackmann et al. | |
| 2011/0025459 A1 | 2/2011 | Denison et al. | |
| 2011/0252843 A1 | 10/2011 | Sumcad et al. | |
| 2012/0280790 A1 | 11/2012 | Gerhardt et al. | |
| 2014/0077929 A1 | 3/2014 | Dumas et al. | |
| 2014/0375422 A1 | 12/2014 | Huber et al. | |
| 2016/0260271 A1* | 9/2016 | Belhadia | G06F 21/32 |
| 2017/0011573 A1* | 1/2017 | Belhadia | E05B 47/0615 |

FOREIGN PATENT DOCUMENTS

| | | |
|---|---|---|
| EP | 2725823 | 4/2014 |
| EP | 2821970 B1 | 4/2016 |
| JP | 2006104696 | 4/2006 |
| KR | 20060121439 | 11/2006 |
| WO | 2009036585 | 3/2009 |
| WO | 2009036585 A1 | 3/2009 |
| WO | 2010105374 | 9/2010 |
| WO | 2010105374 A1 | 9/2010 |
| WO | 2014029774 | 2/2014 |
| WO | 2014124529 | 8/2014 |
| WO | 2014140814 | 9/2014 |

OTHER PUBLICATIONS

Kieron Osmotherly (from original article), Acsys News Article, Cell Site Security and Access Control Problems?, Jun. 15, 2013, http://www.acsys.com/NewsCenter/CompanyNew/26/Cell-site-security-and-access-control-problems?.

Ainhoa Barrio Baranano, International Search Report and Written Opinion of the International Searching Authority, Jun. 7, 2016, 11 pages, European Patent Office, Rijswijk, Netherlands.

\* cited by examiner

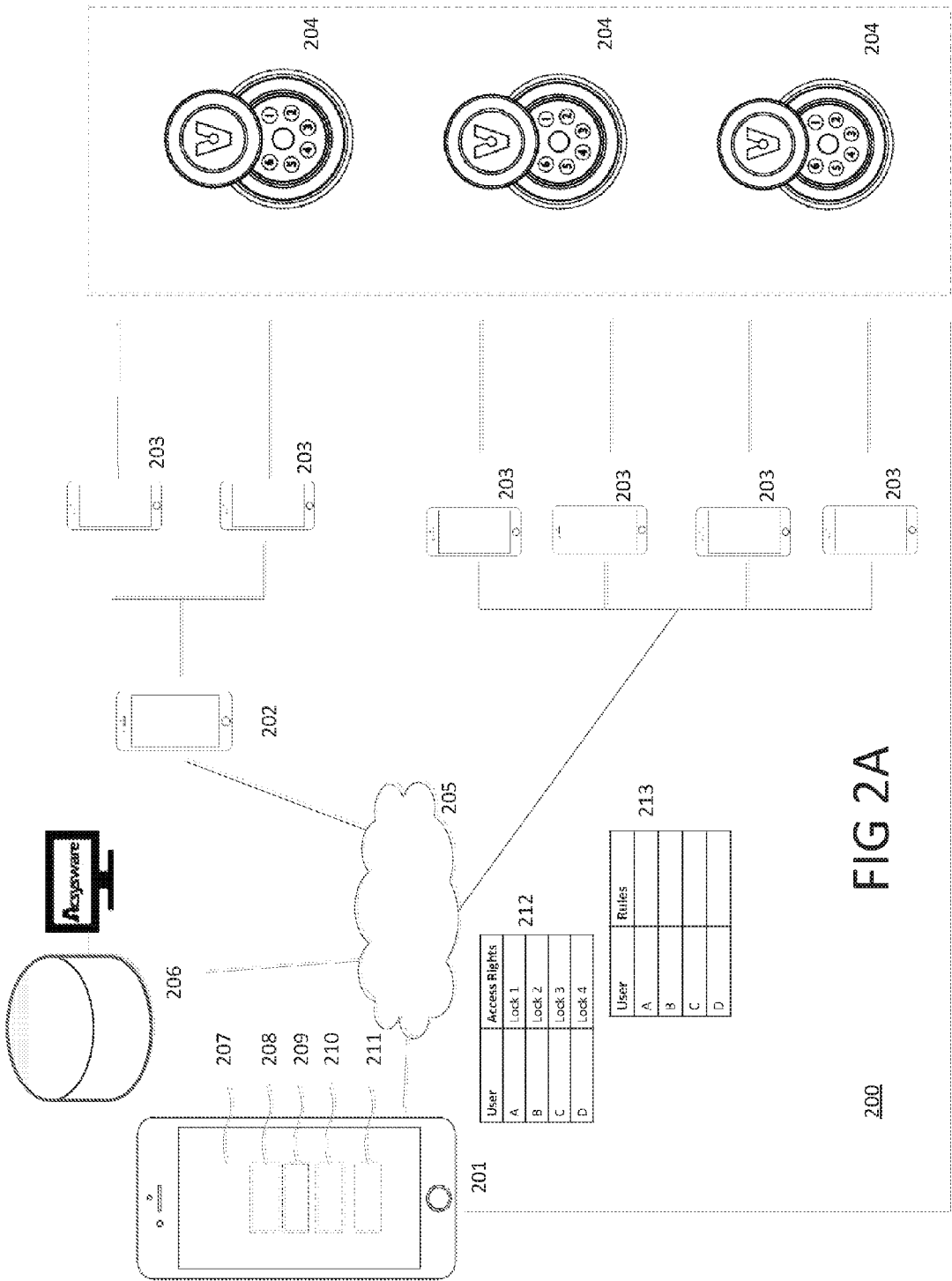

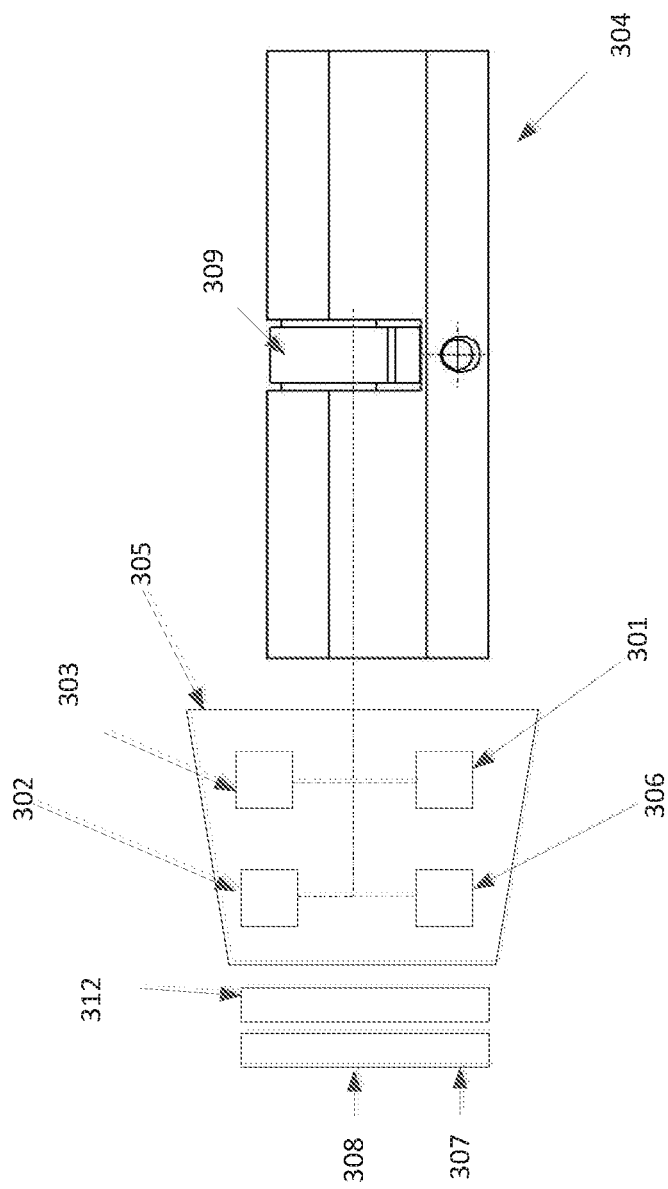

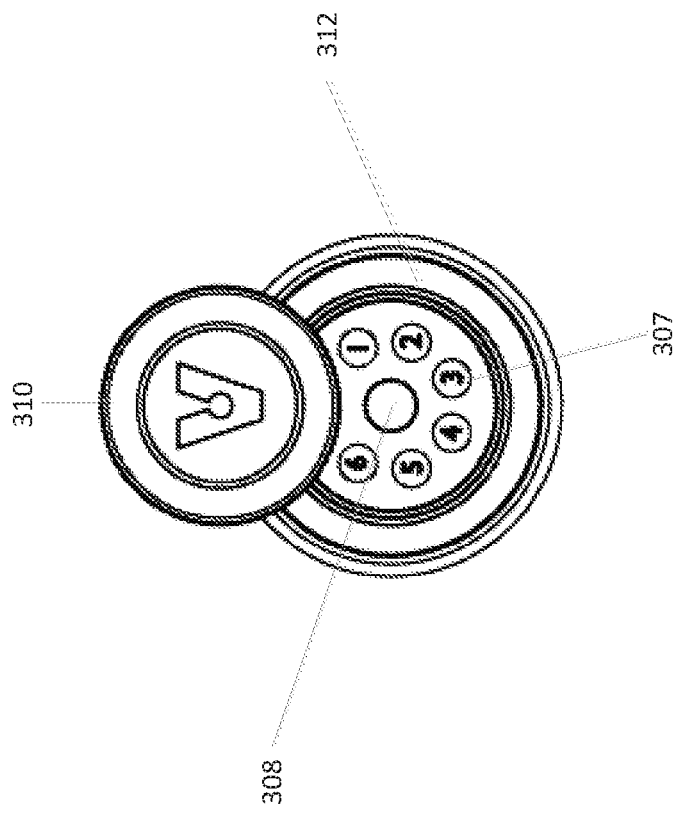
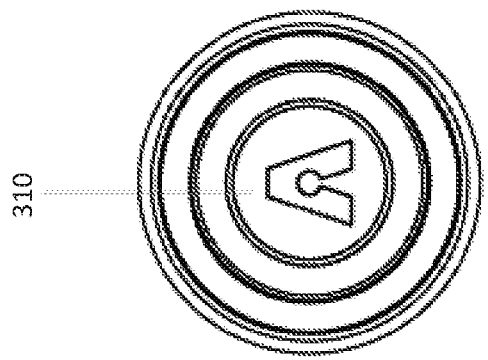
FIG 3B

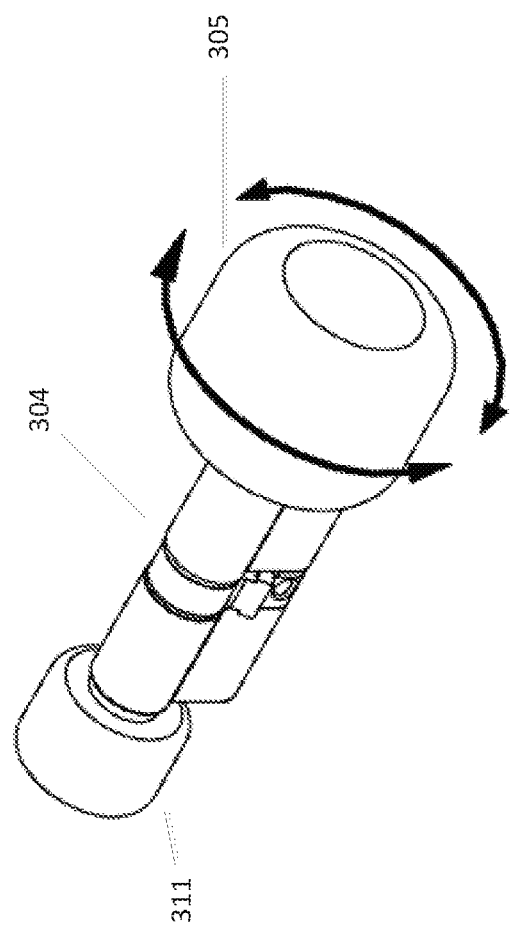

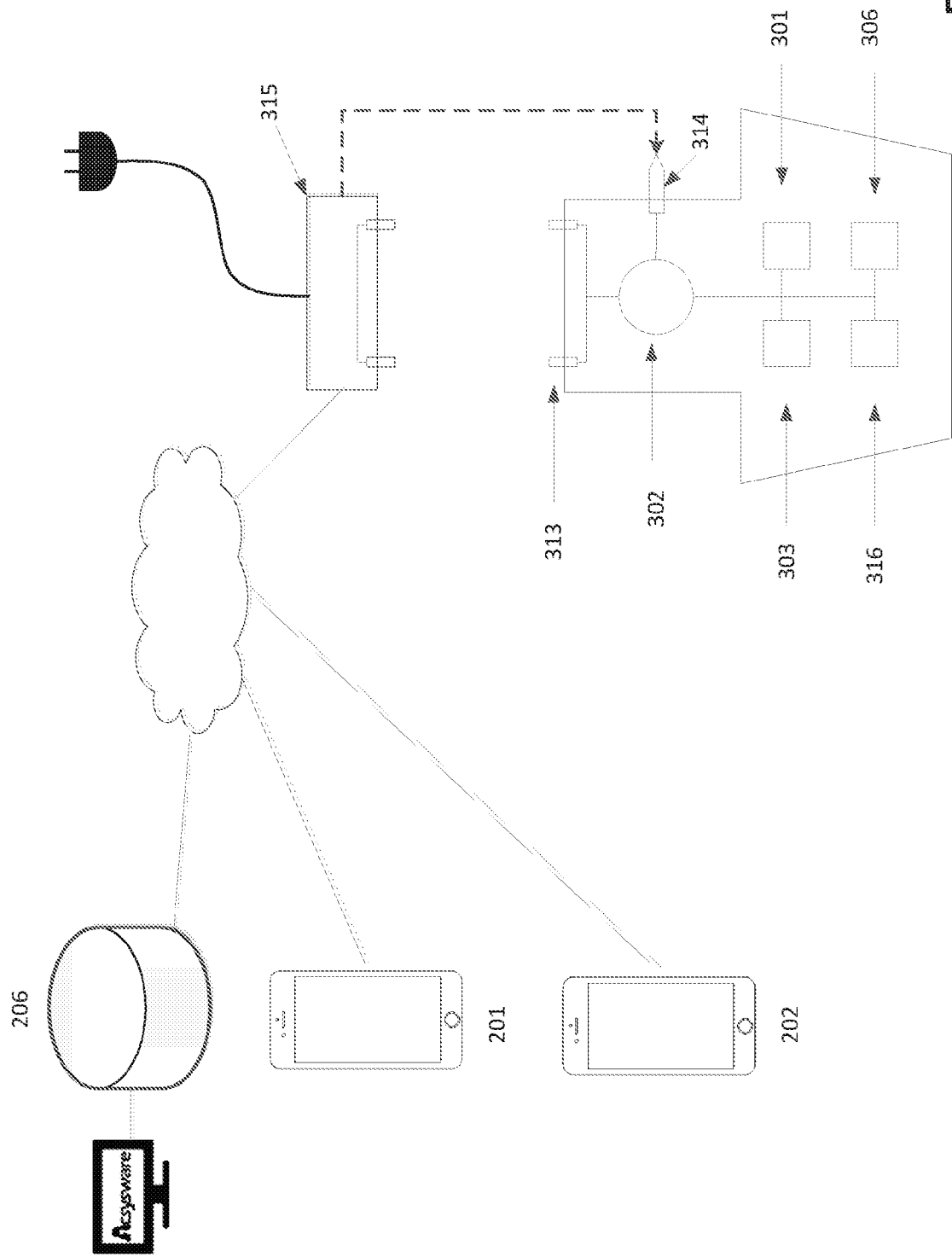

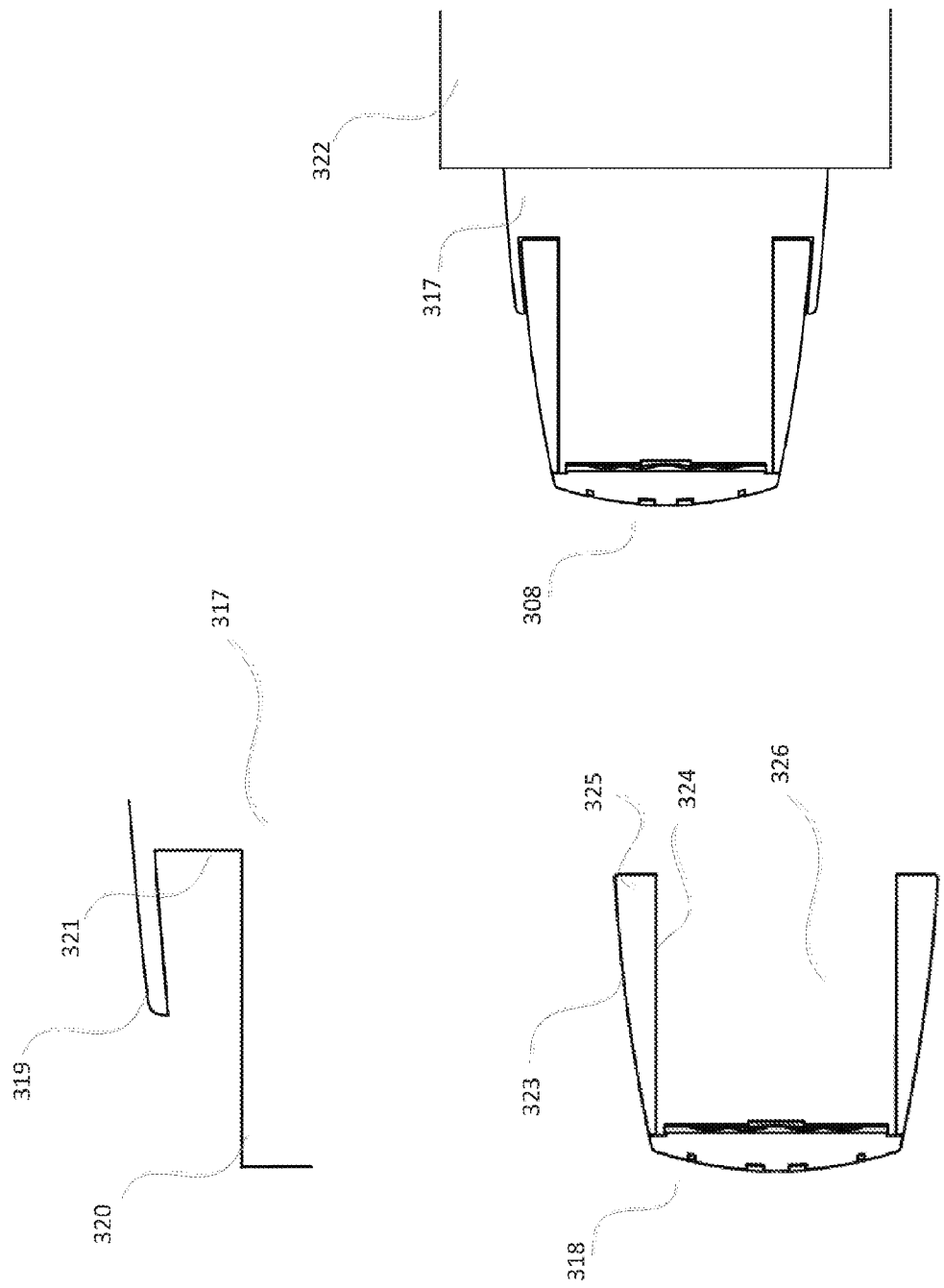

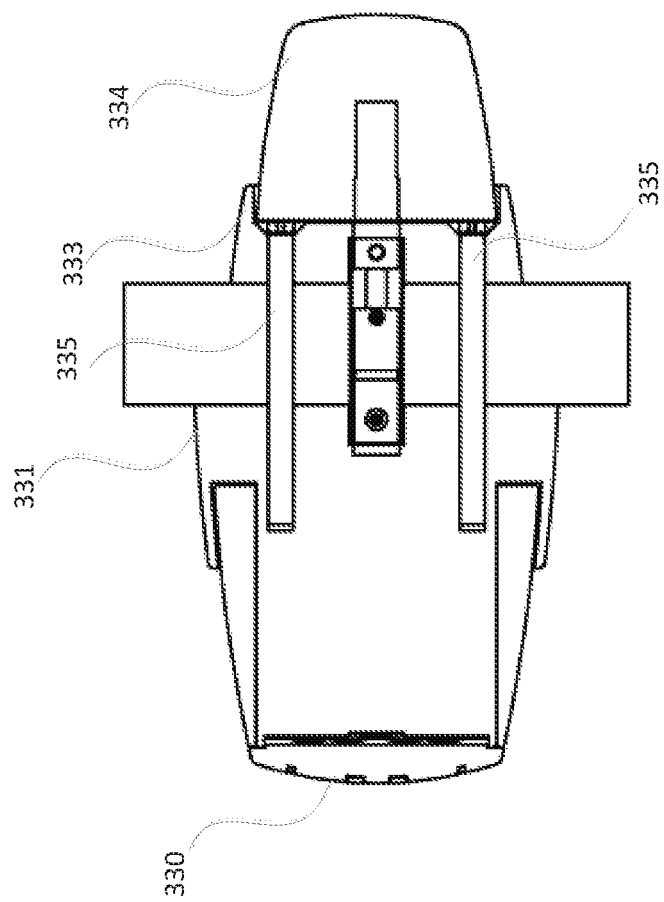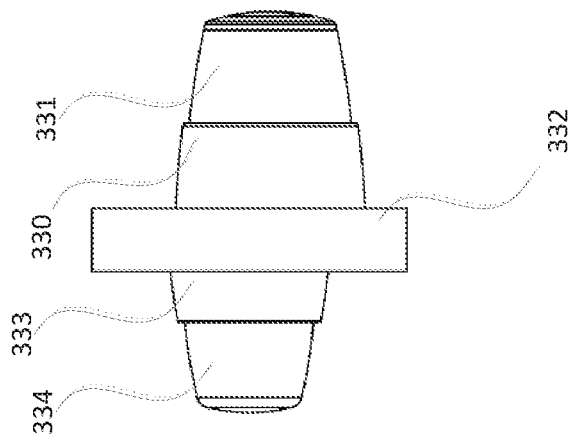
FIG 3H

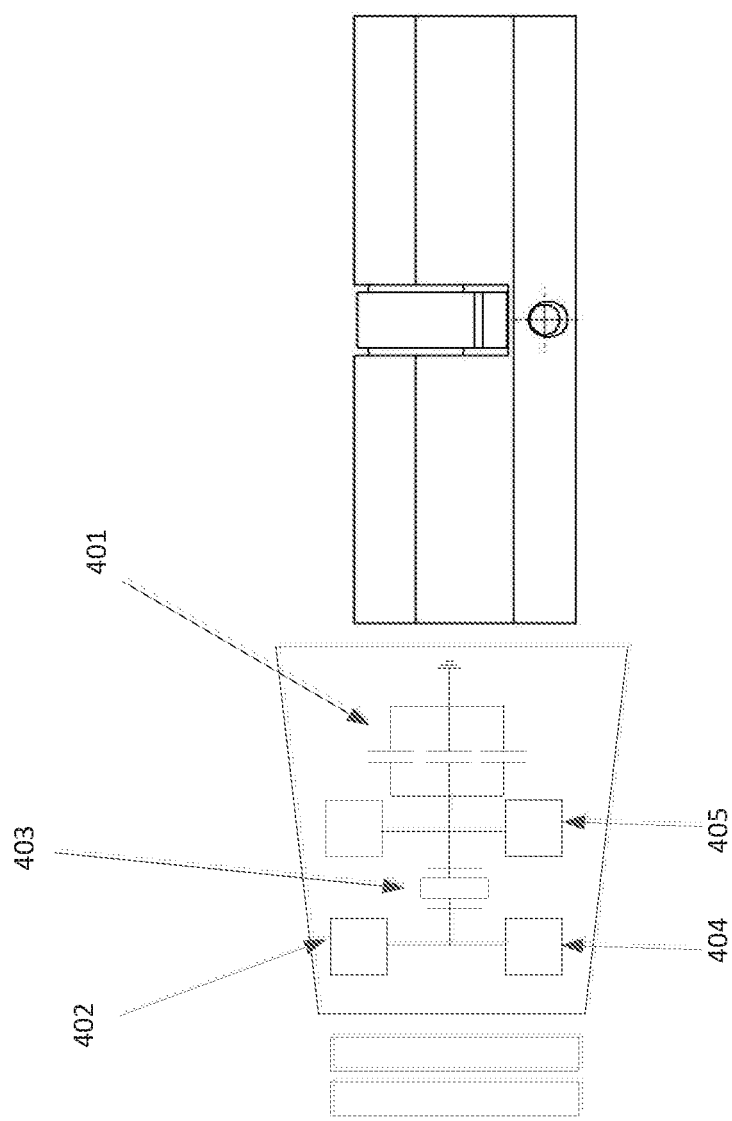

FIG 9A

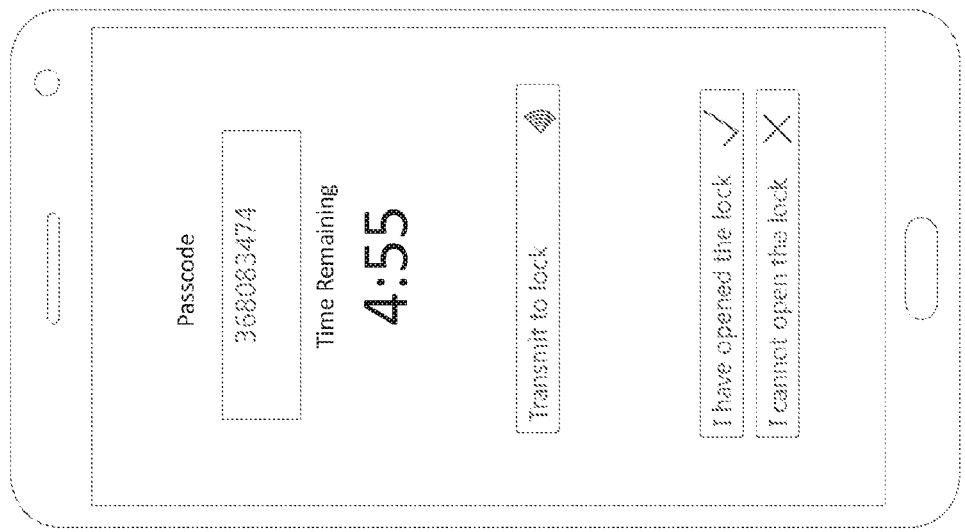
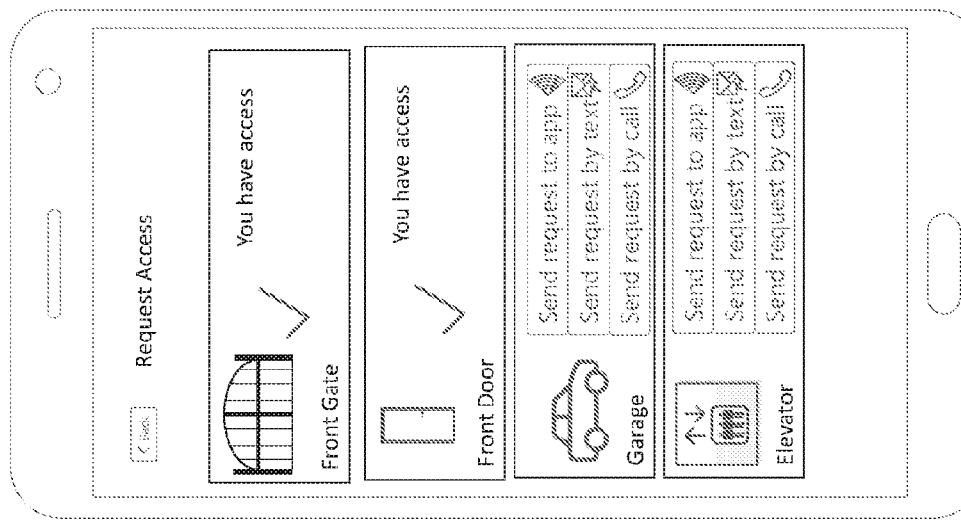
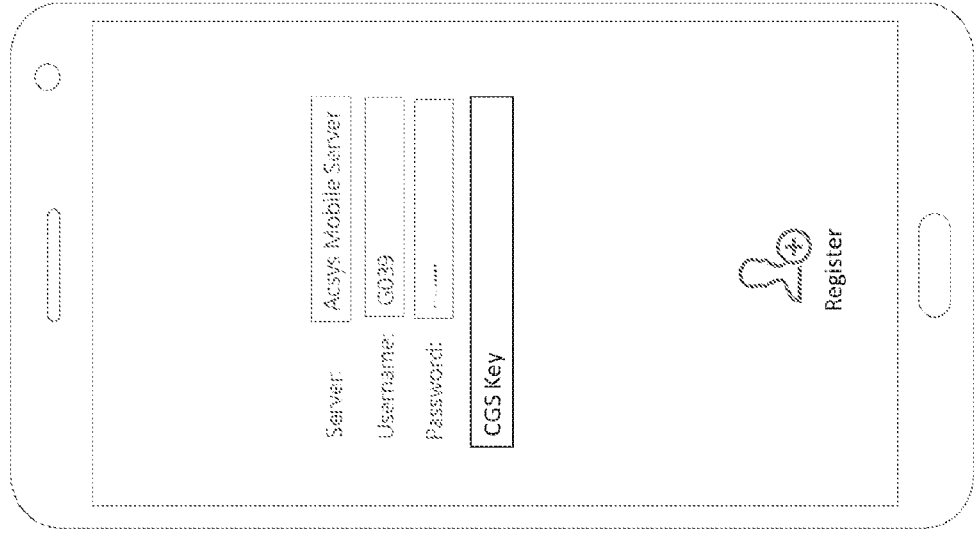
FIG 10C
FIG 10B
FIG 10A

SYSTEMS AND METHODS FOR SECURE LOCK SYSTEMS WITH REDUNDANT ACCESS CONTROL

CROSS-REFERENCE TO RELATED APPLICATIONS

The present application claims priority to U.S. Provisional Patent Application No. 62/189,195 filed on Jul. 6, 2015, which is incorporated herein by reference in its entirety. The present application is related to U.S. patent application Ser. No. 15/060,327 filed on Mar. 3, 2016, and U.S. patent application Ser. No. 15/147,759 filed on May 5, 2016, both of which are also incorporated herein by reference in their entirety.

FIELD OF THE INVENTION

The present invention is related to locks and mobile devices, and more particularly, to systems and methods for securing lock and access control systems having redundant channels of access.

BACKGROUND

The access control market continues to see improvements with the integration of biometric or wireless communication technologies into lock systems to form what is commonly referred to as mechatronic locks, or smart locks. Smart locks may generally fall into two categories: 1) cylinder-based smart locks; and 2) surface-mounted smart locks.

Cylinder-based smart locks are usually supplied with a removable button that includes a wireless reader. These wireless button readers are configured to receive and process wireless signals sent by a user device, such as for example, an RFID-enabled smart card or RFID-enabled smart phone. These card-based or phone-based wireless devices may then be used as a key to obtain access to one or more locks. After processing wireless signals received from the user device, the wireless button reader typically communicates instructions and information to electronics in the button or in the cylinder of the mechatronic lock. If the user has sufficient credentials, the button or cylinder will then activate another device within the button or cylinder that allows the user to open the mechatronic lock by turning the button in either a clockwise or counter-clockwise direction. Rotating the button thereby allows the user to engage or disengage a deadbolt of the mechatronic lock. One of the advantages of the cylinder-based RFID locks is that they are easy to install, in most cases require no wiring, and are battery-operated which enables them to function autonomously for periods of time.

Another category of locks available today include surface-mounted locks which are controlled by RFID readers, biometric readers, code-based readers, or some combination of each. Some of these locks further include embedded wireless communication transceivers that enable wireless communication with the lock owner. However, these usually require complex and intrusive installation processes, such as drilling or cutting into a door frame for example. As a result, such surface-mounted locks may be as difficult to remove as they are to install. Moreover, surface-mounted locks typically rely on batteries as a power source. However, their dependency on batteries renders the locks vulnerable to battery drainage or failure. Although many surface-mounted locks have a hidden mechanical key override in case of battery failure, these overrides are unsecure because they may be easily bumped, picked, or drilled. Once bumped, picked, or drilled, other redundant security features intended to enhance the lock's security, such as biometric scanners, become futile.

Cylinder-based smart locks with RFID button locks are likewise vulnerable to vandalism, in part, because of the way they are installed. Indeed, as shown in FIG. 1A, wireless reader buttons 108 on some products available today are usually attached to a mechatronic cylinder 101 by a pivot or metal bar 102. This pivot or metal bar 102 is usually freely rotating when not in use, which prevents an ill-intended user from breaking or vandalizing the lock 100. Specifically, some mechatronic cylinders may become disabled if an unwanted trespasser simply applies a large amount of rotational force to the button, allowing the unwanted trespassers access to a user's home. With a freely rotating pivot, the mechatronic cylinder will not typically become disabled by brute rotational force. As shown in FIG. 1A, a pivot 102 is typically a narrow conduit that couples electronics on the button 103-105 to electronics inside the mechatronic cylinder 106. The instructions sent to the mechatronic cylinder 101 either engage or disengage the button which, in turn, will engage or disengage the cylinder's deadbolt, thereby providing access to the user.

Additionally, integrating wireless communication capabilities generally requires adding a continuous and reliable source of power to the lock. For example, the wireless buttons depicted in FIG. 1A generally have a single power source 105. To prevent tampering, the single power source 105 is typically configured inside the button 108 which is disposed on the surface of the door facing inwards. However, these power sources 105 may lose charge or suffer from other failures unexpectedly. When the power source 105 is depleted or fails, users are typically required to call a lock professional to replace the power source or cut, drill, and break down the door frame 109 entirely. Although some lock systems have added alternative supplementary power sources to power the inside button 108 from the outside facing door surface, these devices are often located in the room that has been secured by the lock or are not readily available.

Other drawbacks to using RFID cylinder-based smart locks exist. Generally, RFID cylinder-based smart locks use passive RFID technology, which is known to be vulnerable to hacking or reverse engineering. Moreover, they lack flexibility in situations where a user's device 110 (e.g., their RFID-enabled card or RFID-enabled smart phone) is lost or stolen. In these scenarios, information associated with the user's RFID-enabled card or RFID-enabled smartphone will have to be physically deleted from memory of the lock. This typically requires a system administrator or locksmith to travel to the location of the lock and physically update the memory and any associated electronics in the lock. Because a system administrator and locksmith would have to repeat this process for each lock, the cost of updating such a system can grow significantly if the lost or stolen RFID-enabled card was configured to access a large number of locks.

Further, because these locks do not typically provide an alternative redundant access channel for opening the lock, a user may be prevented from accessing a site and locked out until a replacement RFID-enabled card has been provided, the RFID-enabled lock has been updated, or someone else with credentials to the lock has been found. Similarly, users who rely on their RFID-enabled smartphone may be locked out if their phone battery is depleted and the phone is OFF, because the RFID features may not work.

A large number of users in various countries and population segments today still do not own or have access to a smartphone. Thus, many solutions that only rely on RFID-enabled smartphones are not feasible. Some manufacturers have incorporated biometric readers or keypads for entering access codes into their access control systems in an effort to provide a solution to these users without access to smartphones. However, due to the size, price, and power constraints of the components used in biometric readers or code-based solutions, the quality and level of security provided by these alternative access channels may be limited.

The credentials (e.g., a fingerprint or fixed numeric passcode) used in connection with these alternative access channels may be stored in a local memory embedded in the lock. Thus, enrolling a new user typically requires the user to be physically present at the site of the lock to enter his or her credentials (e.g., a fingerprint or fixed numeric passcode), or have his or her credentials transferred via a portable memory device, such as a USB flash drive. In either scenario, a system administrator may be required to be physically present at the lock to manually transfer the user's credentials onto the lock. In the event a user no longer needs to have access to any of the locks, another on-site visit may be required to update the lock to remove the user's credentials and access information from the lock.

Another drawback to these systems is the lack of control for temporally restricting access to a lock. That is, once access to a lock has been given to a user (e.g., by entering his or her passcode or fingerprint onto the lock), it is difficult to control when the user can have access to the lock. Typically, users of these systems are given access to a lock on a 24/7 basis. Thus, most of these devices also do not keep usage logs of various events or activities that provide information on the lock's usage. Accordingly, lock owners or system administrators are typically unable to analyze information about when a particular lock was used and who attempted to use the lock.

Although some locks store logs containing usage information, they are usually stored in a memory system located on the lock, and thus, may require an administrator to make an on-site visit to the lock to electronically transfer the logs. Some manufacturers have enabled locks to wireless communicate information to devices such as a user's smartphone. However, these locks suffer from similar power limitations as those described above. Specifically, the wireless communication devices in these locks consume a significant amount of power when sending and receiving data. Thus, wireless communication devices powered by batteries may only be operated for limited amounts of time before becoming drained and depleted.

In comparison to cylinder-based RFID button locks, mechanical locks usually do not have a protruding button and are therefore not prone to the same level of vandalism. Further, they are not vulnerable to power supply failures. Mechanical locks are however, by their design, prone to attack by other tools that may allow an ill-intended person to gain access to premises by breaking, tearing, drilling or cutting the cylinder with various tools available from the trade.

In order to protect the lock from such attacks, some mechanical lock manufacturers provide a protection device against such vandalism called an anti-drilling rose 111. Anti-drilling roses are typically added to the face of the cylinder on the external-facing side of a door. As shown in FIG. 1A, anti-drilling roses are generally stout casings made of a durable material that cover portions of the exposed cylinder. Anti-drilling roses are typically screwed 112 into place from the inside of the door outwards, which prevents any disassembly of the system from the outside of the door, but does allow disassembly from the inside of the door. Anti-drilling roses 111 are typically durable enough to withstand blunt strikes with hammers, tearing off with special pliers, and drilling that would otherwise break a mechanical lock. However, anti-drilling roses are typically impractical to add to mechanical cylinders as they usually have a freely rotating anti-drilling protection disc that prevents the lock and key from being used as normal. Moreover, anti-drilling roses are not considered aesthetically pleasing, and therefore, are not often used despite the enhanced security protection they provide.

RFID button locks typically do not have anti-drilling roses. Thus, they are not protected against sideway thrusts of force, such as a heavy sideway thrusts of a hammer, which can dislodge the button from the cylinder body. When a button is dislodged from the cylinder body, the lock may be broken and inoperable, or the lock may be broken and an ill-intended user may gain access to the premises.

There are currently on the market a number of devices that use Bluetooth technology to enable communication between a lock and a smartphone. However, Bluetooth communication may also be vulnerable to hacking as well, because ill-intended persons may intercept and decode the Bluetooth signals being communicated between the phone and lock.

Accordingly, what is needed is a more secure wireless cylinder-based smart locking solution that can be opened and operated by a card, smartphone or by other redundant means such as biometric readers or access codes. The solution should also be managed by a smartphone application, mobile device, or computer, enabling a lock owner to control access rights for locks and users wirelessly and in real-time. The control over the access rights should allow the system owner to give selective permissions to users, by for example providing some users with unlimited access to a lock, and other users with time-restricted or single-usage access rights. The solution should also be capable of withstanding various forms of physical vandalism and tampering, rendering it highly secure. The solution should also incorporate redundant power supplies to prevent power failures and not include a mechanical override in case of power failure.

SUMMARY OF THE INVENTION

In various embodiments, the invention provides systems, methods, and apparatuses for controlling and monitoring an access control system. According to some embodiments of the invention, an access control system includes a smart lock that provides redundant access control. The smart lock includes a storage medium, a power source, a hardware processor, a cylinder having a cam that engages a bolt, and a button that engages the cam to unlock the bolt.

The button includes a plurality of redundant access channels for receiving authentication information. The redundant access channels may include a biometric scanner for receiving biometric information, a passcode keypad, and/or a wireless transceiver for receiving a token from a mobile device and transmitting a response to the mobile device.

The smart lock is configured to validate authentication information received from the passcode keypad, biometric scanner, and/or mobile device based on a set of rules determined by an administrator, and unlock the bolt if a user is authenticated through a first channel of the plurality of redundant access channels. If a user cannot open the smart lock through the first channel, the smart lock is enabled to allow access through a second channel of the plurality of redundant access channels. In this way, when a user can no longer access a smart lock using a first channel, the user may open the lock using a second channel.

Access control systems may include one or more smart locks. The systems may be accessed by users who request access to the smart locks, and controlled by masters or administrators who restrict access to the smart locks. In some embodiments, users may access, and masters or administrators may control access to smart locks from their respective mobile devices in near real-time. Masters and administrators may use mobile devices to configure rules and access rights that control how and when a user may open a smart lock. In this way, an access control system may be provided that allows masters and administrators to control and monitor users in near real-time, without having to install hard-wired internet or data connections onto a door or lock. Because the cylinder is adaptable to fit standard slots, door frames and lock systems do not need to be modified or retooled.

In some aspects of the invention, masters or administrators may configure rules and access rights that restrict how users access smart locks. Access rights specify which locks users may access, and the configurable rules specify conditions that must be fulfilled before opening the smart lock. The rules thus allow a master or administrator to restrict a user's access based on location and time. In this way, a master or administrator is enabled to precisely control how a user may open a smart lock.

Masters and administrators may require users to request a passcode or token each time an attempt is made to open the smart lock. When a user submits a request, a master or administrator may receive the request in near real-time and determine whether to grant the user access. The master or administrator may require the user provide additional authentication information, such as a password, to ensure the identity of the user. If the master or administrator determines to grant the user access, a token or passcode is transmitted to the user in near real-time. In some embodiments, the requests may be sent based upon a triggering event. Thus, a master or administrator may control a user's access on a case-by-case basis.

Passcodes may be fixed or dynamic. Dynamic passcodes enable masters or administrators to grant users single-use or time limited access to locks. Passcodes may be provided to the lock wirelessly from a mobile device or manually entered onto a keypad. Thus, users are enabled to gain access to a lock with a passcode even if their mobile device is unavailable.

In some embodiments of the invention, the wireless transceiver of the smart lock is configured to communicate to a mobile device, as well as a network device, a control access server, or an administrator device, directly and in near real-time. The lock may then receive communications from the network device, control access server, or administrator device instructing the lock to grant or deny access to a user.

According to some embodiments of the invention, the smart lock includes a wireless modem configured to create a cellular broadband connection and communicate to an administrator device or a central access server in near real-time. When a lock receives a token, a biometric scan, or passcode, it may transmit a request for access to the lock based on a set of configurable rules. The lock may then receive an instruction to grant or deny the request for access from the administrator device or central access server in near real-time. In this way, if a user's mobile device is unable to communicate to an administrator device or a central access server, the lock may establish a connection by itself to the administrator device or central access server. Thus, the lock may communicate to the administrator device or central access server without relying on the user's mobile device to relay communications.

In other embodiments of the invention, the smart lock may also be configured to communicate to a network device that relays the communications to the administrator device or central access server. The network device may be a wireless receiver, router, repeater, or similar device that uses a near field wireless transmitter or a wireless LAN for establishing a short range wireless connection. Thus, the smart lock may similarly create a connection to communicate to the administrator device or central access server without relying on the user's mobile device to relay communications.

The smart lock may include an inertial module. The inertial module is configured to determine a door status that indicates whether a door has been opened or closed. The lock may similarly be configured to determine a bolt status that indicates the locked or unlocked position of the bolt. The lock is enabled to communicate the door status and bolt status to the administrator device or central access server in near real-time. Thus an administrator device or central access server may determine whether a door has been left open, shut closed, locked, or unlocked.

According to some embodiments of the invention, the button of the smart lock may be removable and rechargeable. The button may include a recharge interface that matches a recharging interface of a recharge station. When the button's power is low, a user may remove the button and recharge the button with the recharge station. In yet further embodiments of the invention, the button may include an I/O port that allows a user to power the button from, for example, an external device, or a recharge station. The I/O port further allows a user to retrieve access information stored on the button. Thus, while a button is recharging on a recharge station, the recharge button may retrieve access information stored on the button through the I/O port. In some embodiments, the recharge station is coupled to a network connection that enables it to communicate access information to the administrator device or central access server.

According to some embodiments of the invention, the lock further includes a rose protector and the button forms a rose knob. The rose protector and the rose knob protect and conceal the hardware processor, the power source, and the cylinder. The rose protector has an outer wall and an inner wall forming an annular groove for interlocking with the rose knob. The inner wall is formed substantially perpendicular with respect to the door, while the outer wall is formed conically with respect to the door. As a result of the conical shape of the outer wall, the annular groove has a graduating thickness that decreases along a plane normal to the door. In this way, the shape of the outer conical wall deflects strikes of brute force.

The rose knob has an exterior surface and an interior surface. The exterior surface and interior surface form an annular rim for interlocking with the annular groove of the rose protector, and an opening comprising the power source, the hardware processor, and the redundant access channels for receiving authentication information. The annular rim has a thickness that matches the graduating thickness of the annular groove.

The rose protector has a set of through-holes for one or more securing rods and one or more fasteners that secure the rose protector to the door. Thus, when the rim of the rose knob slidably interlocks with the annular groove of the rose protector, the rose knob is irremovably secured to the rose protector. The rose knob is freely rotatable until validate authentication information is received from the passcode keypad, biometric scanner, or mobile device, upon which the rose knob is configured to actuate the cam to unlock the bolt. The rose knob and rose protector are constructed of sturdy materials, such as stainless steel, and may have finished surfaces that reduce the surface's coefficient of friction. In this way, the rose knob or rose protector prevent against vandalism and tampering.

BRIEF DESCRIPTION OF THE FIGURES

The objects and features of the invention can be better understood with reference to the following detailed description and accompanying figures.

FIGS. 2A, 2B, 2C, and 2D show access control systems according to embodiments of the invention.

FIGS. 3A, 3B, 3C, 3D, 3E, 3F, 3G, and 3H show smart locks for use in access control systems according to embodiments of the invention.

FIG. 4 shows a smart lock with rechargeable power sources according to embodiments of the invention.

FIGS. 9A, 9B, 9C, 9D, 9E, and 9F show interfaces for controlling to smart locks in an access control system according to embodiments of the invention.

FIGS. 10A, 10B, and 10C show user interfaces for accessing smart locks in an access control system according to embodiments of the invention.

DESCRIPTION OF THE INVENTION

Embodiments of the present invention include systems, methods, and apparatuses that enable users to open locks using redundant access channels, and allows masters or administrators to control a user's access in near real-time.

Figure 1A:
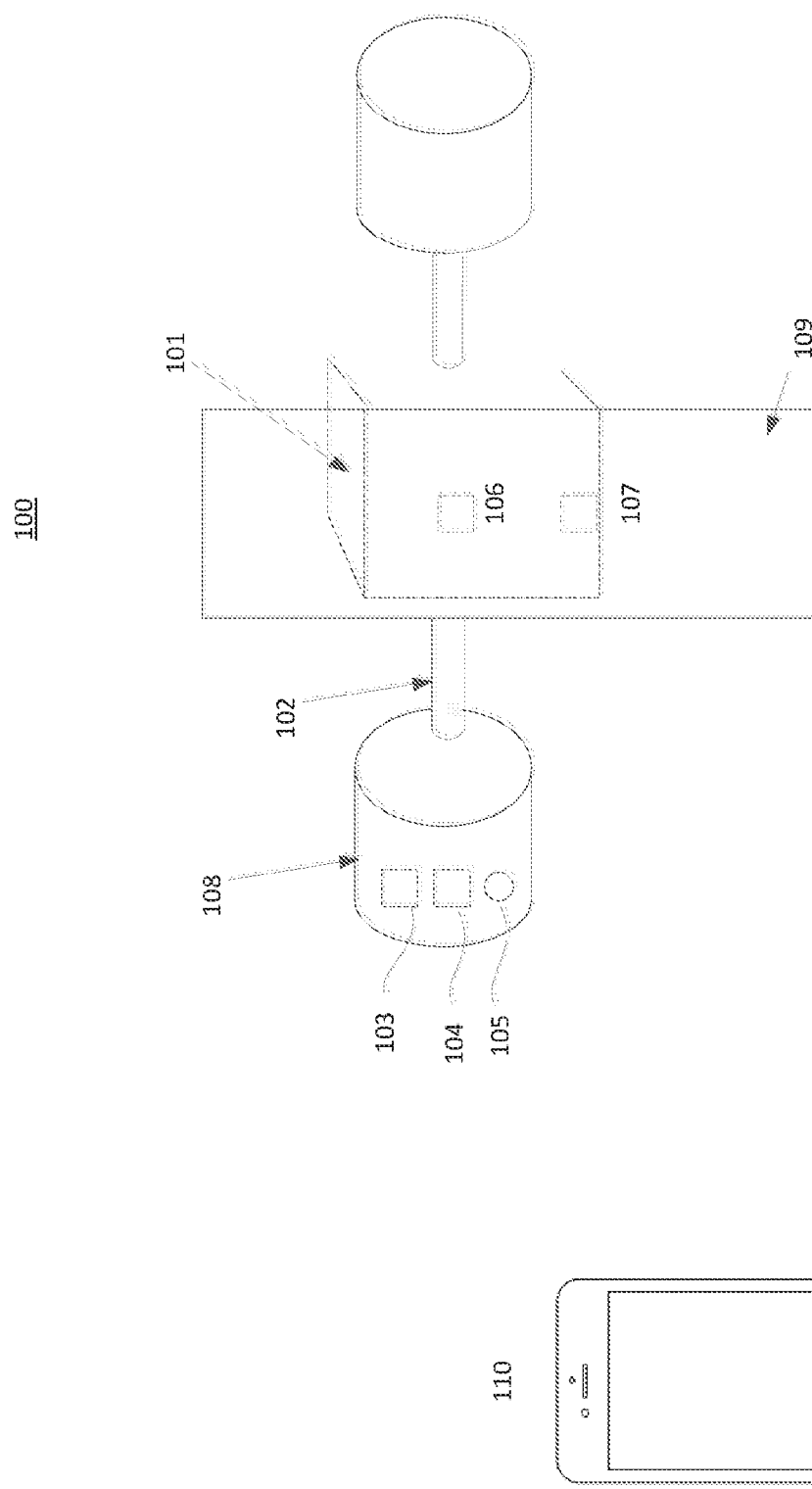
FIGS. 1A and 1B show exemplary wireless reader buttons and anti-drilling rose configurations.
Figure 1B:
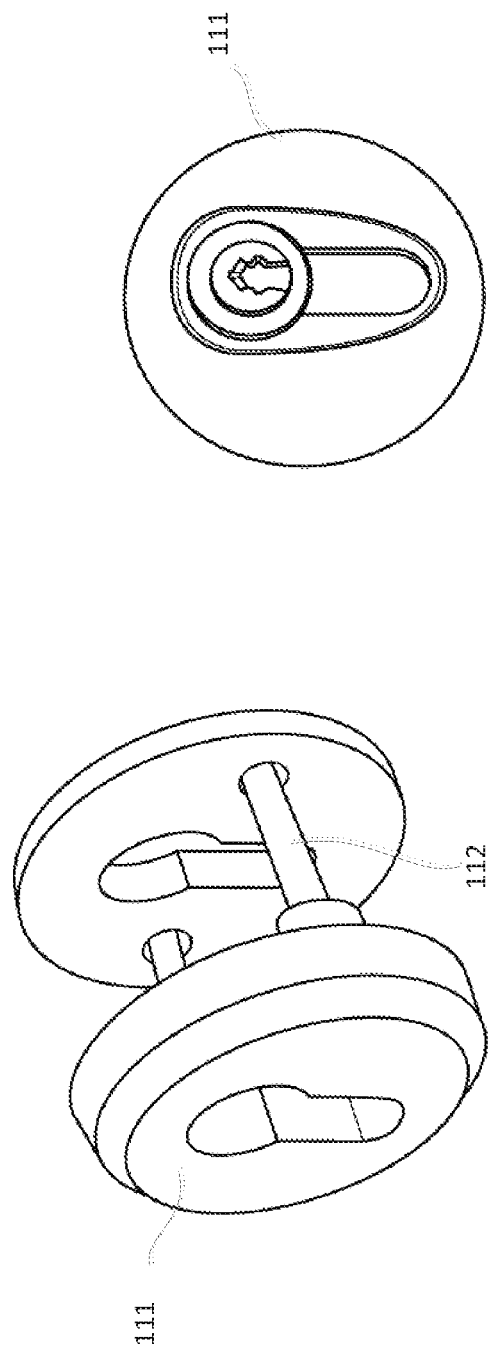
Figure 2B:
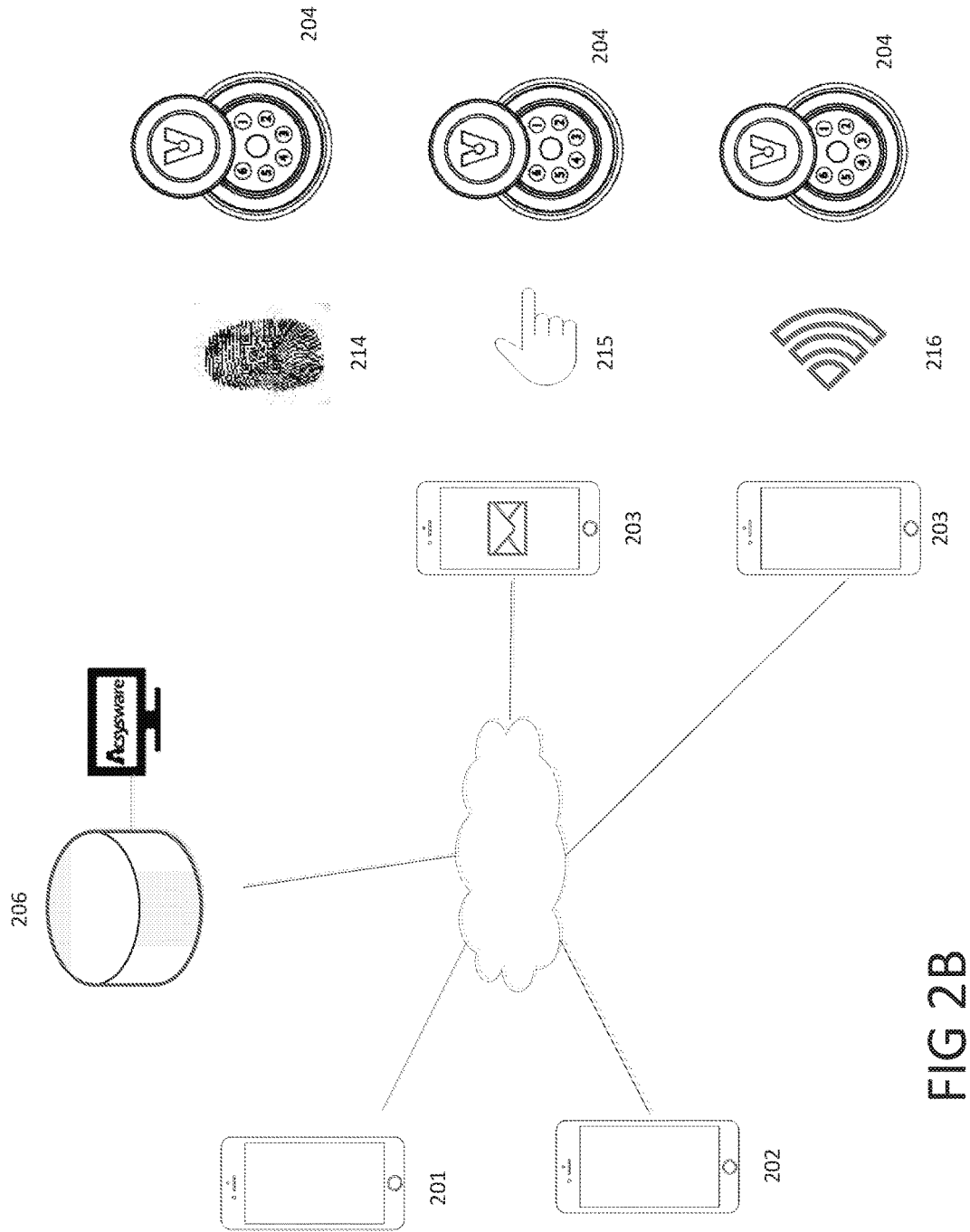

An exemplary access control system that provides redundant channels of access to users while communicating usage information in near real-time is shown in FIGS. 2A and 2B. The system includes one or more smart locks 204, a central access server 205, and devices 201, 202, and 203 for accessing and controlling the smart locks. Users open the smart locks 204 through one or more access channels as described in more detail below. Masters and administrators control how the users access the smart locks 204 from a master device 201 or administrator device 202. Users may communicate with masters, administrators, and open smart locks from a user device 203. Users may also open smart locks manually, without any need for a user device 203. A central access server 205 relays and stores information exchanged between a user and a master or administrator in near real-time. It is noted that "near real-time" communications are communications that may appear as occurring in real-time or substantially in real-time, but experience slight, unnoticeable or insignificant delays due to network infrastructure. When a user can no longer open a smart lock through one of the access channels because, for example, the access channel is unavailable or becomes inoperable, a user can open the smart lock through the other available access channels. Thus, the access control system 200 enables users to open smart locks using redundant access channels, and allows masters or administrators to control a user's access in near real-time.

The master device 201 and administrator device 202 create and assign rules and access rights to users seeking to obtain access to one or more smart locks 204. Access rights identify the smart locks 204 that each user is authorized to open. Rules add conditions that must be met before a user is allowed to open a smart lock 204. For example, access rights may be configured by a master device 201 or administrator device 202 to specify a group of smart locks 204 a user may open, while rules specify what day and time the user is allowed to open the particular smart lock.

As shown in FIG. 2B, master devices 201 and administrator devices 202 are also configured to specify which access channels a user may use to provide authentication information to open a smart lock 204. As explained in more detail below, an access channel may be for example, scanning biometric information into a biometric scanner 214, entering a passcode on a keypad 215, or wirelessly transmitting a token from a mobile device 216. The smart lock may provide a combination of any or all access channels to the user. For example, a first access channel for regular or default use may be wirelessly communicating a token from a user's mobile device 216, and a second and third access channel may be the biometric scanner 214 passcode keypad 215, respectively, for use in the event that the first access channel becomes unavailable to the user.

The master device 201, administrator device 202, or user device 203 may be mobile device, a software service, or a software application. Mobile devices may be for example, a smartphone, tablet, or handheld. Mobile devices include a touchscreen display 207, storage medium 208, and processor 209. In some embodiments, mobile device includes a wireless transceiver 210 for receiving and transmitting RFID, NFC or Bluetooth signals, or over the mobile device's cellular or internet connection.

Central access server 205 may be a cloud-based server and may connect to a remote server 206. Remote server 206 may include a call center with agents for receiving user calls and access requests.

In some embodiments of the invention, the mobile device includes an NFC element 211 which may be a SIM or SD card that is equipped with an NFC transmitter. An NFC-enabled SD card may be placed into the SD card slot of the mobile device, providing a smartphone with NFC communications capability. Similarly, an NFC-enabled SIM card may be placed into the SIM card slot of the mobile device, providing a smartphone with NFC communications capability.

As shown in FIG. 2A, individuals in the access control system may have different roles. For example, an individual may be a master, administrator, or user. A master can add, remove, and configure access rights of administrators or users. Administrators can similarly add, remove, and configure access rights of users. Users are the individuals who seek access to a site secured by a smart lock. The access rights for individuals may be configured for each user or administrator, or at a more general level for a group of users or administrators. Similarly, a user or administrator may be given access to a specific smart lock, or for a group of smart locks.

For example, in a commercial setting of the access control system, the master device 201 or administrator device 202 may be operated by supervisors or managers who wish to control how and when their employees access areas within a business. A business manager may designate a supervisor as an administrator, who can further designate one group of employees as users with access to a particular group of smart locks. As another example, in a residential setting the master device 201 or administrator device 202 may be operated by parents to control access to, and monitor access information of, people entering different areas of their house. Parents designating themselves as masters could designate their babysitters as administrators and their children as users, and specify which areas of the house the babysitters and children may access and how or when they may access them. As described in more detail below, the supervisors or parents may receive alerts or reports of how and when the employees, babysitters, or children attempted to access the sites controlled by the smart locks 204.

The master or administrator of the access control system configures how users open smart locks with a set of rules 212 and access rights 213. The access rights 213 identify each individual or group of individuals in the access control system, and each smart lock or group of smart locks in the access controls system. The access rights 213 also associate each individual with a smart lock. The set of rules 212 specify what access channels can be used to open the smart lock, and what (if any) conditions are required to enable the individual to open the smart lock. For example, parents designating themselves as masters may configure the access rights and rules for babysitters such that they may open a smart lock using the passcode, or biometric scan. The rules may further be configured with conditions such that the babysitter may only open the smart lock on certain days of the week, or after the parents approve each request for access.

The access rights and rules may be stored in the mobile device of the master, administrator, user, smart lock, or central access server. As explained in more detail below, a master or administrator may create, modify, or delete access rights and rules from a master device 201, an administrator device 202, or the central access server 205. When a master or administrator creates, modifies, or deletes an access right or rule, the access right or rule may be communicated to the central access server or mobile device of the user. The mobile device of the user may then transmit the access right or rule to the smart lock as part of the token. When a user attempts to open the smart lock, the access rights and rules may be checked from the mobile device or smart lock. For example, if the user provides a passcode or biometric scan, the smart lock may check the access rights and rules to determine if a user is authorized to open a smart lock on a given day or time. As another example, before transmitting a token to a smart lock, the user's mobile device may check the access rights and rules to determine if the user is authorized to open a particular smart lock. If the user does not have authorization, the mobile device will not transmit the token to the smart lock. In some embodiments of the invention, the access rights and rules may be checked from the master device 201, administrator device 202, or central access server 205.

Smart locks may be installed to secure specific areas or rooms within a site, enabling the master or administrator to precisely control where an individual may gain access. For example, in a cell tower, smart locks may be installed on the front door of a facility, a door of a storage room, and a door of a cabinet, where batteries, copper cables, electronic equipment and other assets that are commonly a target for theft are secured. A business manager (e.g., master) may then grant certain employees (e.g., users) access to the facility, while restricting access to the storage room and cabinet door to a select few employees. As described above, the business manager may further configure rules to specify how the employees access the smart locks, and what (if any) conditions enable the employee to obtain access.

As another example, the areas within a site may be, for example, a basement, backyard, bedroom, front gate, fitness center, or garage. Thus, in the residential setting a parent may enable a babysitter to access a basement, backyard, or the parent's bedroom, but only during the specific time interval that the babysitter is babysitting. As described below, the parent may further configure the rules to grant the babysitter conditional access rights that require the babysitter to request permission each time he or she seeks access to a smart lock. Parents may further configure the access rights and rules to grant children access to different areas or rooms within the home, and under heightened restrictions. For example, the parent may configure the access rights and rules to deny children access to rooms in the house, such as the basement, or restrict access to areas such as the fitness center during a specific time of day. Parents may further configure the rules to specify which access channels the children may use to access the area, such as for example, using the child's fingerprint to access a backyard.

According to some embodiments of the invention, a user opens one or more smart locks 204 by wirelessly communicating 216 from the user's mobile device to the smart lock. By using the wireless capabilities of the user's mobile device, the smart lock 204 may be linked to the central access server 205 without a direct connection between the two. In this way, access to a smart lock 204 may be controlled remotely and without the need for implementing a hard-wired system on a door frame or lock.

As described above, smart lock 204 may be opened by wirelessly transmitting a token from the user's mobile device to the smart lock 204. A token contains a passcode that includes letters, numbers, symbols, or any combination thereof. The passcode may be dynamic or fixed, as discussed in more detail below. A smart lock 204 validates the token based on access rights and rules determined by the master or administrator and by comparing the received passcode with a passcode produced by a process stored in the smart lock 204. If the received passcode matches the passcode produced by the process, the smart lock 204 will accept the token. The smart lock 204 communicates to the user's mobile device 203 whether the token has been validated based on the access rights and rules and whether it matches the token produced by the stored process. This information may then be sent from the user mobile device 203 to the central access server 205, where it may be relayed as a notification or alert to a master device 201 or administrator device 202.

Master devices 201 and administrator devices 202 are configured to specify whether a user can access a smart lock 204 with the wireless capabilities of the user's mobile device, and what access rights the user has. For example, the master devices 201 and administrator devices 202 may specify whether a user's access rights to a particular smart lock 204 or group of smart locks 204 are fixed or conditional.

Conditional access rights allow a master or administrator to approve each attempt by a user to open a smart lock 204. For example, when a user with conditional access rights attempts to access a smart lock 204 or group of smart locks 204, the system will alert a master device 201 or administrator device 202 that the user 203 is seeking access to the smart lock 204, and in near real-time request the master device 201 or administrator device 202 to grant the user access to the smart lock 204. The user may then determine whether to grant or deny the user access. The determination may be based on additional conditions or verification steps. For example, the master or administrator may request the user provide identification information that proves the user's identity or authenticity, such as for example, an additional password. As another example, the master of administrator may deny the user access because the user was not intended to access that particular smart lock 204, or was not intended to have access on that particular day or time. If the master or administrator determines the user's access to the smart lock 204 should granted, the master device 201 or administrator device 202 may then provide the user with a token as described in more detail below. If the master or administrator determines the user's access to the smart lock 204 should be denied, the master device 201 or administrator device 202 does not provide the user with a token, and the user will be unable to open the smart lock 204. In this way, a master device 201 or administrator device 202 may allow or deny access to a smart lock 204 in near real-time. In some embodiments, when the master or administrator determines whether to grant or deny the user access, the master device 201 or administrator device 202 sends an alert to the user notifying the user that their request for access has been granted or denied.

Fixed access rights allow users to obtain access to a smart lock 204 without first receiving approval from a master device 201 or administrator device 202. For example, a user may be granted fixed access rights to open a particular smart lock 204 without restriction. Such fixed access may be provided with a fixed passcode, for example, which a user may enter on the keypad of the smart lock 204. The user may then open the smart lock 204 with the fixed passcode without first requesting approval from a master device 201 or administrator device 202. In some embodiments the user's mobile device 203 may still inform the master device 201 or administrator device 202 when a user with fixed access rights has accessed or attempted to access a smart lock 204. For example, after a user enters a fixed passcode on the smart lock keypad, the smart lock may communicate to the user's mobile device that it received a valid fixed passcode and unlocked the smart lock. The user's mobile device may then notify a master device 201, administrator device 202, or central access server 205, in near real-time that the user accessed and unlocked the smart lock 204.

The master device 201 and administrator device 202 may also be used to allow a user to open one or more smart locks 204 with a passcode entered on a keypad 215 or biometric scan 214. These access channels enable a user to obtain access to a smart lock 204 without using a mobile device, because as described in more detail below, a passcode or biometric scan may be manually input by the user. In this way, a user may obtain access to a smart lock 204 in the event they do not own a mobile device, or their mobile device is lost, broken, or otherwise incapable of transmitting a token wirelessly to the smart lock 204. Thus, according to some embodiments of the invention, the keypad for entering a passcode or biometric scan serve as redundant access channels that provide the user with access to the smart lock 204. In other embodiments of the invention, the keypad for entering a passcode or biometric scan may serve as a primary or default access channel, and wirelessly communicating from the user's mobile device to the smart lock 204 may serve as the redundant access channel. In yet further embodiments of the invention, users may be required to authenticate themselves using a combination of alternative access channels. For example, a user may be required to provide a combination of a dynamic passcode and a fingerprint before being granted access to a lock.

As described above, a token may include a passcode that may be wirelessly transmitted from a user's mobile device 203 to a smart lock 204. As described in more detail below, the passcode may also be displayed on the user device so that the user may manually enter it onto the keypad of the smart lock 204. A smart lock 204 validates the fixed passcode by comparing the entered passcode to passcodes generated by processes stored on the smart lock 204. If the process generates a matching passcode, the smart lock 204 will grant the user access.

In some embodiments of the invention, the passcode may be a dynamic passcode generated by a Code Generation System (CGS). A dynamic passcode is a unique, single-use, time-limited or one-time passcode that is generated by the central access server upon request. The passcode is based in part on the time the passcode was requested.

According to some embodiments of the invention, the generation of the passcode provided to the user is based on unique information about the user's mobile device and the time the passcode is requested or being generated. For a mobile device, the passcode may be based on, for example, the International Mobile Equipment Identity ("IMEI"), the network ID of the mobile device, or a combination of the two IDs, and the time the request was sent from the mobile device.

Alternatively, the passcode may be fixed. A fixed passcode does not change or expire, may be used more than once, and may be obtained without request from a master or administrator. Masters or administrators who wish to prevent fixed passcodes from being compromised may require fixed passcodes to be used in conjunction with other information or a biometric scan.

A user may request a dynamic or fixed passcode by contacting a master or an administrator. For example, the user's mobile device 203 may include a mobile application that allows the user to send a request for a passcode to a master device 201 administrator device 202, or central access server 205, over the mobile device's cellular data, WiFi or NFC/Bluetooth connection. As another example, a user may submit a request by placing a voice call or sending a text message to a master, administrator, or central access server agent from the user's mobile device. In this way, a user may send a request even when the mobile device is unable to connect to the internet, or is not equipped with a data or internet connection.

In some embodiments of the invention, smart lock 204 may be opened by providing a biometric scan of a user. As described in more detail below, smart locks 204 include a storage medium 301 that may store biometric data for each user that was granted access to the lock. Biometric data may include, for example, fingerprints of each user. When the user receives a biometric scan, the smart lock 204 compares the scan to the biometric data stored at the smart lock 204. If the scan matches the stored biometric data, the smart lock will grant the user access. When the biometric scanner is used as a redundant access channel, a user may provide a biometric scan if, for example, the user does not have or loses his or her mobile device and is incapable of obtaining a token or passcode.

Figure 2C:
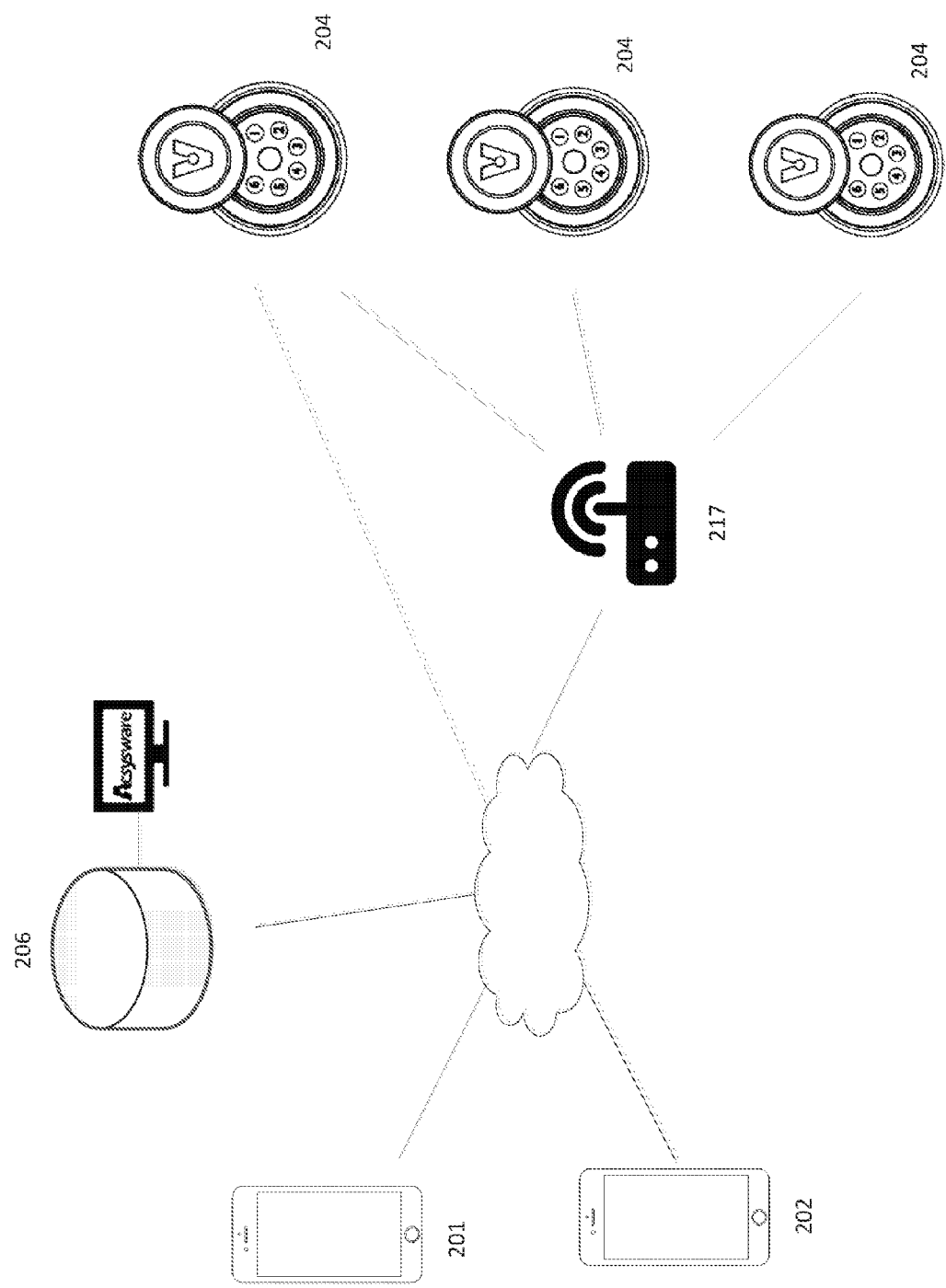

FIG. 2C shows the smart lock 204 is coupled to a master device 201, administrator device 202, or a central access server 206, thereby bypassing the mobile device, according to some embodiments of the invention. For example, the smart lock 204 may be coupled to a network device 217, that relays the communications to the master device 201, administrator device 202, or central access server 206. Network device 217 may be, for example, a wireless receiver, router, repeater, or similar device. As another example, the smart lock 204 may engage in two-way communication directly with the master device 201, administrator device 202, or central access server 206 over a cellular broadband connection as described in more detail below.

In configurations where the smart lock 204 communicates to a network device 217 as shown in FIG. 2C, the smart lock 204 may use a near field wireless transmitter or a wireless LAN for establishing a short range wireless connection. The connection may be established using, for example, Bluetooth, NFC, ZigBee or similar short range wireless network technologies. For example, the network device 217 may be a wireless repeater, extender, or router located within the home, and communicate to the smart lock using Bluetooth. The network device 217 may then be coupled to a master device, an administrator device, or a central access server, using a network connection, such as an internet, Ethernet or similar connection. The network device 217 may then relay the communication from the smart lock to the master device, administrator device, or central access server, in near real-time. Thus, even when a user's smartphone or mobile device is stolen or inoperable, the smart lock is enabled to communicate to the master device, administrator device, or central access server, in near real-time.

Figure 2D:
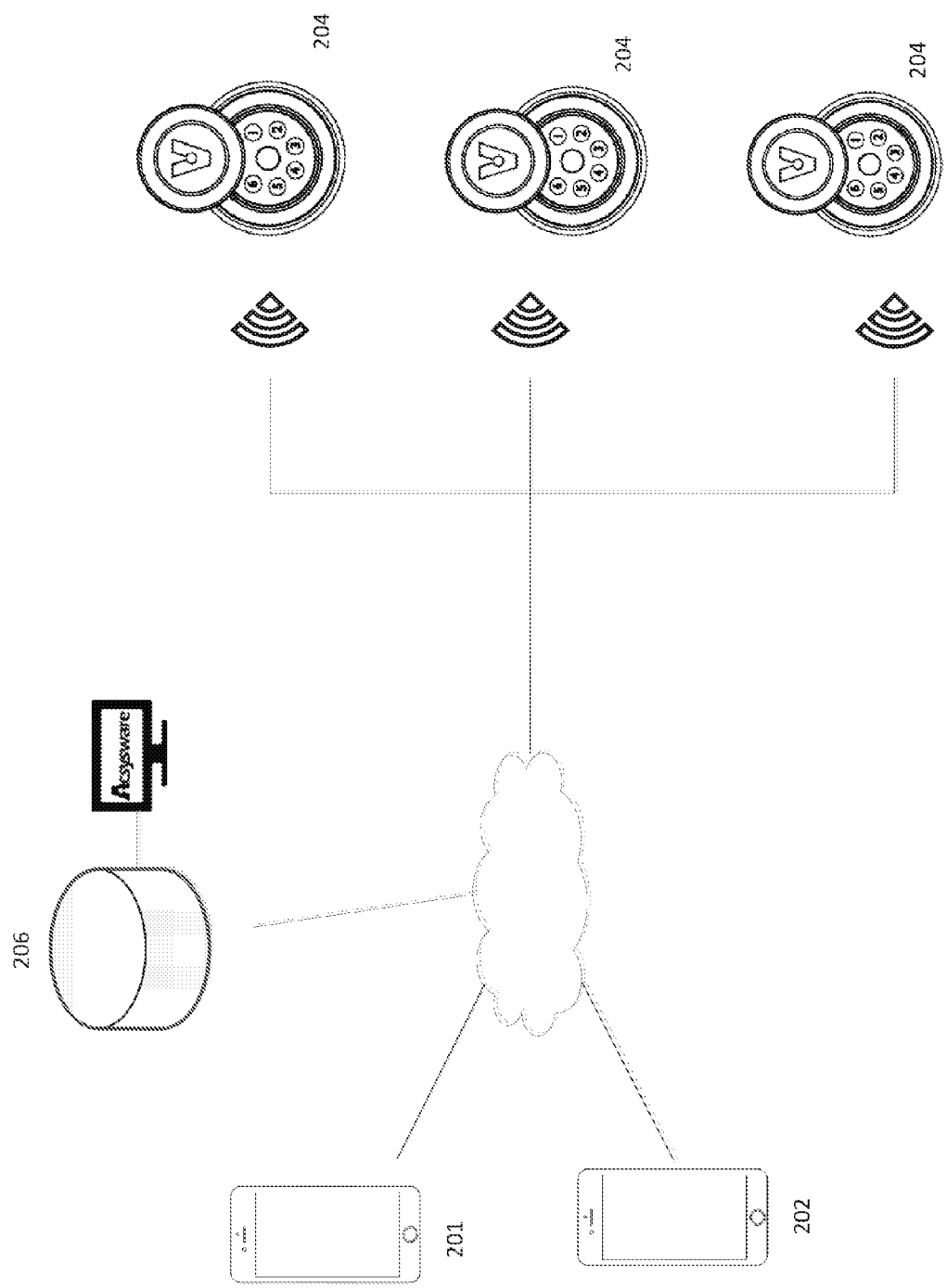

In some embodiments of the invention, the smart lock may include wireless transmitters that communicate directly to a central server or administrator, as shown in FIG. 2D. For example, the smart lock 204 may include a cellular broadband or wide area network connection that enables the button to communicate to a master device 201, administrator device 202, or central access server 206 directly. The lock may include a wireless modem for creating a cellular broadband connection and communicate information in near real-time. For example, the modem may be an Intel XMM 6255 3G modem that is embedded on a chipset in the lock. In further embodiments, the modem may be a USB dongle, data card, or similar device for providing access to a cellular network and may be coupled to the lock through an I/O port as described in more detail below. The cellular network may be for example, a GSM|GPRS, EDGE, UMTS, HSDPA, HSPA, HSPA+, CDMA, LTE, or similar cellular network.

Enabling the smart lock to communicate to a master device, administrator device, or central access server, provides additional control over users accessing a smart lock. For example, the smart lock may be configured to transmit a request to a master device or administrator device for approval each time the user attempts to gain access to a smart lock. Thus a master or administrator may approve each request for access even where a user is attempting to gain access using a passcode or biometric scan.

As another example, the smart lock may use the connection to the master device, administrator device, or central access server to verify a user is authorized to open the smart lock. Specifically, after receiving authentication information, the smart lock may communicate to a master device, administrator device, or central access server, which checks a set of configurable rules to verify that the user is authorized to access the smart lock.

In another aspect of the invention, the master device, administrator device, or central access server may communicate instructions to the smart lock to perform certain functions or processes. For example, if the central access server determines that the bolt of the smart lock is unlocked, the central server may instruct the smart lock to lock the bolt. In this way, if an administrator or user leaves a home without remembering whether he or she locked the door, the administrator or user may confirm that the door is unlock, and if so, lock it remotely. In other embodiments, the master device, administrator device, or central access server may communicate instructions to the smart lock to block communications received from certain devices, or biometrics received from certain users. For example, if a user's mobile device has been reported as lost or stolen, the master device, administrator device, or central access server may instruct the smart lock to block any communications it receives from that particular mobile device. Similarly, a master device, administrator device, or central access server may send an instruction to a smart lock that a particular user shall no longer be allowed to use their biometric scan to unlock a smart lock, and report any such biometric scans it receives from that user.

According to some embodiments of the invention, the button includes an inertial module to detect and measure the movement and position of a door. The inertial module may include a combination of sensors for detecting and measuring movement and/or position, such as for example, a MEMs-based accelerometer, gyroscope and/or a magnetometer. The MEMs-based accelerometer may be 1-, 2-, or 3-axis accelerometers, and the measurements may include, for example, the door's velocity and acceleration over these axes. The measurements provided by the accelerometer may be filtered and analyzed to determine whether the motion correlates to the opening or closing of the door. Other sensors that may be used may include magnetic sensors, such as a magnetic switch, that generate measurements in response to changes in their magnetic fields. Potentiometers may also be used to generate signals corresponding to the angular movement and position of the hinge of the door-frame. Yet other embodiments may include optical or ultrasonic sensors that measure reflections in light or sound waves as the door opens or closes.

Measurements made by the sensors of the inertial module are used to track changes in position and door movement, enabling the button to determine if the door is open or closed shut. In some embodiments, the button may determine whether the door is open or closed by comparing the sensors measurements with known acceleration and/or movement profiles associated with the opening and closing of a door. For example, the movement of a closing door may be characterized by changes in its acceleration; if a sharp increase in acceleration (i.e., a user pushing the door), is followed by an abrupt decrease (i.e., the door contacting the door frame and closing shut), the button may determine that the door is shut. As another example, the movement of a closing door may be characterized by its speed; if the speed or acceleration reaches a maximum threshold, it may be determined that the door has reached a velocity or speed such that it would eventually close shut. Similarly, if the speed or acceleration of the door never reaches a minimum threshold, it may be determined that the door was not pushed with sufficient force to shut close. The button may be configured to keep track of what times the door was opened or closed. For example, the button may record when the door was opened or closed by keeping a log in the storage medium of the smart lock.

In further aspects of the invention, these sensors may be used to detect whether the bolt of the lock cylinder has been rotated, thereby indicating whether a user has locked or unlocked a door. For example, the accelerometer may be used to detect the rotation of the button that causes the bolt to extend into a door mortise. The button may also be configured to keep track of what times the cam has been engaged to lock or unlock the bolt. In some embodiments of the invention, the button may incorporate the locked or unlocked status of the bolt to confirm whether a door was opened or closed. For example, if the button detects that the door was closed, the button may confirm that it was closed by determining whether the bolt changed from an unlocked state to a locked state, indicating that the door was shut closed, and locked.

In some embodiments of the invention, the button communicates whether the door is opened, closed, locked or unlocked to a network device, an administrator device, a master device, or a central access server. In this way, a user may remotely determine whether their door was left open or shut closed.

FIGS. 3A and 3B show a smart lock according to some embodiments of the invention. The smart lock includes a storage medium 301, a power source 302, a hardware processor 303, a cylinder 304, and a button 305. The smart lock may also include a wireless transceiver 306, a passcode keypad 307, and a biometric scanner 308. The cylinder includes a cam 309 that engages a bolt (not pictured). A user provides authentication information to the smart lock, which is validated by the hardware processor 303 and storage medium 301. Authentication information may be, for example, a user's scanned fingerprint, a passcode entered onto the keypad, or a token wirelessly transmitted from the user's device. When the smart lock validates the authentication information, the button 305 engages the cam 305, which unlocks the bolt. Storage medium 301 stores information and data for validating authentication information, keeping logs of access events and smart lock usage, and identifying the smart lock. For example, the storage medium may store biographic data of users authorized to open the lock or unique identification numbers that identify the smart lock.

The hardware processor 303 is configured to validate authentication information received from the access channels based on the access rights and rules determined by a master or administrator. The hardware processor may unlock the bolt when a user is authenticated through an access channel. In one aspect of the invention, when the first redundant access channel becomes unavailable to the user, the hardware processor 303 is configured to allow access through a second redundant access channel to unlock the bolt.

In some embodiments, the smart lock includes a wireless transceiver 306 for receiving and transmitting RFID, NFC or Bluetooth signals to a user's mobile device. As described above, a user may wirelessly transmit a token to a smart lock 204. When the wireless transceiver 306 receives the token, the smart lock validates the token as described above. The wireless transceiver may also communicate access information to the user's mobile device. Access information provides details about access events, such as which users have accessed the smart lock and when they were accessed. Access information may be stored in the smart lock's storage medium 301. Access information is stored at the smart lock until a mobile device accesses the lock, at which point the smart lock will transmit the access information to the user's mobile device. The mobile device will then communicate the access information to the central access server. When the user's mobile device is stolen or unable to receive wireless communications, the smart lock will wait until the next capable mobile device attempts to access the smart lock.

The smart lock cylinder 304 is adaptable to fit a standard profile slot. In some embodiments of the invention, the cylinder 304 of the smart lock is a Europrofile (or "Euro DIN") design. In other embodiments, the cylinder may be an oval, round, Scandinavian, Japanese, Union or Schlage type of profile. However, where Europrofile cylinders typically include a rotatable knob on the inside of the door for engaging or disengaging a bolt, the smart lock instead has a freely rotating button 305. The freely rotating button 305 may be spun several times around its axis, in contrast to knobs which are typically rotated a half- or quarter-turn to engage or disengage a bolt. As explained in more detail below, spinning the freely rotating button 305 generates rotational energy that may be used to energize and recharge the power source 302 inside the lock for several days.

When the user's authentication information has been validated, the smart lock is enabled to engage the bolt. Specifically, the button 305 may be pushed inwards activating a clutch that engages the cam 309. As the user continues to rotate the button 305, the cam 309 moves the bolt from a locked position to an unlocked position. The user will not be able to open the smart lock until he or she has been authorized to access a site (for example, by wirelessly transmitting a token, providing a biometric scan, or entering a passcode on a keypad). Until the user has been authorized, the button is freely rotating, and will not engage the cam.

As shown in FIG. 3A, the button is disposed at the end of the cylinder facing the outside. In one aspect of the invention, the smart lock uses a single button, which enables the smart lock to be adapted for different sizes or lock formats. For example, the freely rotating button 305 may also be adapted for single entry locks, button entry locks, double entry locks and padlocks. Padlocks, for example, may only include a freely rotating button without requiring an interior knob.

FIG. 3B shows a front view of the cylinder according to some embodiments of the invention. The button may include several access channels, such as a passcode keypad 307 and biometric scanner 308, which may be concealed by a cap 310. In situations where a user cannot unlock a door using their mobile device to wirelessly transmit a token (e.g., a user's mobile device is stolen or the device's batteries have been drained), the user may gain access by using a numeric keypad to enter a passcode, or by using a biometric scanner. When the cap 310 is in a closed position, the cap 310 conceals the keypad 307 from view.

As FIG. 3C shows, the smart lock includes a knob or second button 311 disposed at the opposite end of the cylinder 304 facing the inside, according to some embodiments of the invention. The outer button 305 may have a longer radius and larger thickness than the interior button 311, which as explained in more detail below, may reduce the force or speed that is needed to rotate the button and charge its internal power sources. In embodiments where the smart lock includes an interior button 311, the interior button 311 may engage or disengage the bolt without the need to provide authentication information to the smart lock or requesting access from a master or administrator. Thus, a user may lock or unlock the door to exit the inside of a site at any time.

Figure 3E:
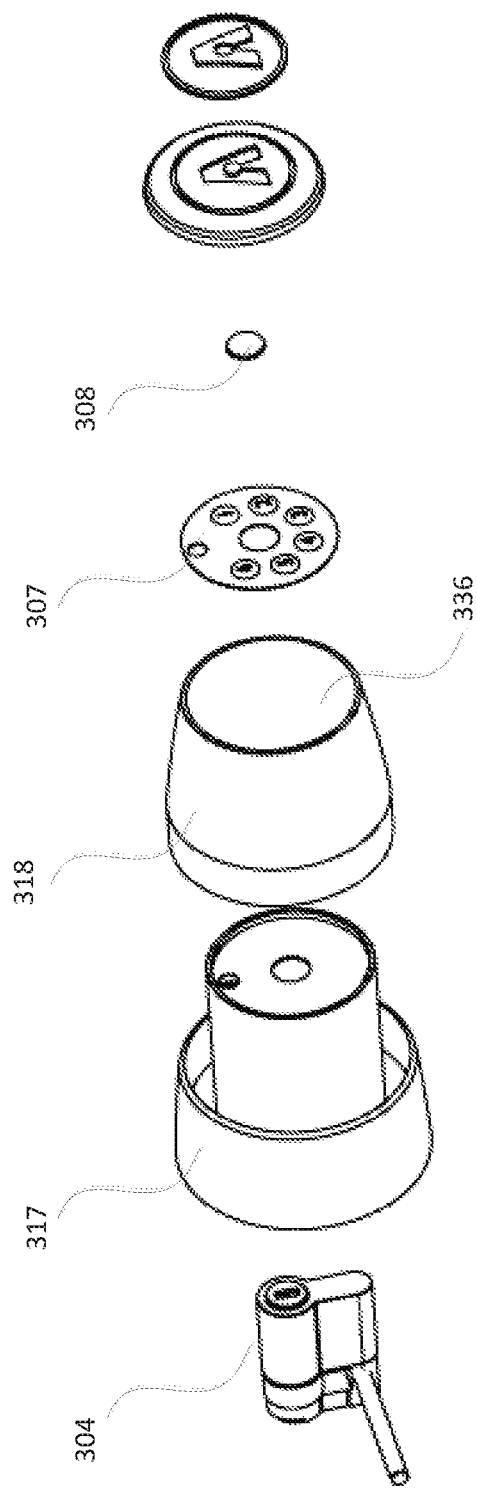

According to some embodiments of the invention, the lock may include a rose protector 317 and the button may form a rose knob 318 as shown in FIG. 3E. Rose knob 318 protects and conceals the mechanical and electronic components inside the smart lock, such as for example, the hardware processor, the power source, and the cylinder. Similarly, rose protector 318 protects and conceals mechanical and electronic components inside lock, such as for example, the hardware processor, the power source, and the cylinder. Together, rose protector 317 and rose knob 318 encase the internal mechanical and electronic components such that these components are entirely shielded from tampering or attack. For example, whereas a forceful blow to a pivot would severely damage or break off the internal components of a lock as discussed above, the rose protector 317 and rose knob 318 shield against and prevent such acts of vandalism. Similarly, the rose protector 317 and rose knob 318 conceal the cylinder in its entirety, preventing someone from picking the lock.

As shown in FIG. 3F, the rose protector 317 has an outer wall 319 and an inner wall 320 forming an annular groove 321 for interlocking with the rose knob 318. The inner wall 320 extends substantially perpendicular with respect to a door 322. The outer wall 319 is formed to have a conical shape, with its axis extending substantially perpendicular with respect to the door 322. As a result of the conical shape of the outer wall 319, the annular groove 321 has a graduating thickness that decreases along a plane normal to the door. In this way, the shape of the outer conical wall deflects strikes of brute force on the rose protector 317. For example, someone using a hammer to strike the rose protector 317 would be unable to hit the rose protector 317 flush with the head of the hammer because of the curvature and angle of its conical surface.

The rose knob 318 may have an exterior surface 323 and an interior surface 324. The exterior surface 323 and interior surface 324 may form an annular rim 325. Annular rim 325 is formed to have a thickness that matches the graduating thickness of the annular groove 321, enabling the annular rim 325 to interlock with the annular groove 321 of the rose protector 317. Exterior surface 323 and interior surface 324 also form an opening 326. Internal mechanical and electrical components, such as for example, a power source, hardware processor, or redundant access channels for receiving authentication information (e.g., a biometric scanner, a passcode keypad, or wireless transceiver) may be disposed in the opening 326.

The rose knob slidably fits within the annular groove 321 of the rose protector 317, allowing the rose knob 318 to freely rotate around its central axis. According to some embodiments of the invention, the rose knob 318 is freely rotatable until valid authentication information is received from the passcode keypad, biometric scanner, or mobile device. When valid authentication information has been provided, the rose knob is configured to actuate the cam to unlock the bolt, as described below. Further, as described in more detail below, when a user cannot open the lock through a first channel, the hardware processor is configured to allow access through a second channel. In this way, someone cannot attempt to vandalize the lock by applying brute rotational force. That is, whereas some locks may be vandalized by twisting the button with an exceeding amount of rotational force, the rose knob 318 may freely rotate until a user has provided valid access information.

In some embodiments of the invention, the rose knob has a frustum 336. The biometric scanner 308 for receiving biometric information and the passcode keypad 307 may both be disposed on the frustum 336. The biometric scanner 308 may be placed in the center of the frustum 336, and the keys of the keypad 307 may be placed around the biometric scanner 308. In this way, the lock may provide multiple channels of access concurrently to a user.

Figure 3G:
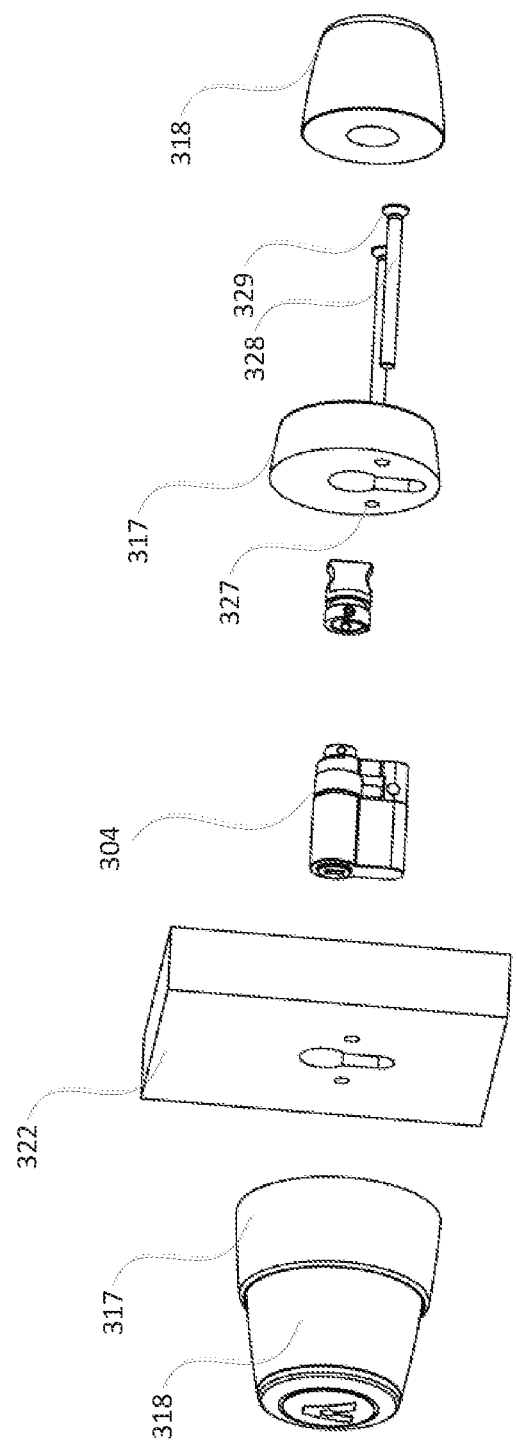

As shown in FIG. 3G, rose protector 317 may have a set of through-holes 327 for one or more securing rods 328 and one or more fasteners 329 that secure the rose protector to the door. Thus when the annular rim 325 of the rose knob 318 slidably interlocks with the annular groove 321 of the rose protector 317, the rose knob 318 is irremovably secured to the rose protector 317.

In some embodiments of the invention, the cylinder may be a double entry cylinder that allows for double button or double keyed access on each side. This allows for embodiments where there may be a first rose protector 330 and a first rose knob 331 disposed on one side of a door 332, while a second rose protector 333 and a second rose knob 334 are disposed on the opposite side of the door 332, as shown in FIG. 3H. In some embodiments of the invention, the electronic and mechanical components, such as for example, hardware processors and power sources, may be disposed in the opening formed by the first and second rose knobs 331 and 334. In further embodiments of the invention, there may be a single set of electronic and mechanical components that are shared by both rose knobs, but are disposed on one side of the door. For example, in some embodiments, there may be a single hardware processor or power source that is disposed in rose knob 334, but also coupled to rose knob 331. Preferably, the rose knob having the single set of electronic and mechanical components is the rose knob disposed on the interior side of the door 332. In this way, if someone attempts to vandalize or tamper with an outer rose knob, the electronic and mechanical components will remain concealed and protected on the interior side of the door.

In some embodiments of the invention, the second rose protector 333 may be fastened to the first rose protector 331 by one or more securing rods and one or more fasteners 335. The one or more fasteners may be inserted from the side of the door of the second rose protector 333. In this way, the one or more fasteners 335 are completely concealed and inaccessible from other side of the door. Thus, the first rose protector 331 may not be removed until the second rose protector 333 has been unfastened and removed.

In some aspects of the invention, the rose knob 318 and rose protector 317 are constructed of a sturdy material, such as for example, stainless steel. In this way, the rose knob 318 and rose protector 317 may withstand severe amounts of force. In some embodiments of the invention, the surface of the rose knob 318 and rose protector 317 may be finished with a finishing process. For example, the rose knob 318 and rose protector 317 may be finished with ultrasonic polishing, magnetic polishing, sandblasting, rumbling, electroplating, chemical coating, hot dipping, buffing, lapping, grinding or burnishing processes. This helps prevents someone from vandalizing or tampering with the lock by attempting to apply an excessive amount of rotational force, as discussed above. According to some embodiments of the invention, a finishing process or coating is applied to the surface to smooth the surface and substantially reduce the rose knob's coefficient of friction. For example, a finishing process or coating may reduce the coefficient of friction for steel from 0.8 to 0.16, or to 0.04. The reduced coefficient of friction thereby prevents someone from applying an amount of rotational force to the rose knob that would cause damage.

Although described in the context of mechatronic locks, according to further embodiments of the invention the button, rose protector 317 and rose knob 318 are adaptable to encase smart locks of various types, shapes and sizes, such as for example a mechanical cylinder lock, or a padlock. For example, the rose protector 317 and rose knob 318 may be added to the cylinder of a padlock in the same manner as described for a single entry cylinder lock described above. As another example, a button, rose knob and rose protector may conform to a standard profile design, such as for example, a Europrofile design (also sometimes referred to as a Euro DIN cylinder), oval, round, Scandinavian, Japanese, Union or Schlage type of profile. In one aspect and advantage of the invention, the rose protector 317 and rose knob 318 are modular and may be retrofitted to standard and/or preexisting profiles of mechanical lock or padlock cylinders without the addition of wires or other parts. Thus, a button, a rose knob, and a rose protector may be used to upgrade existing locks or padlocks without retooling the door frame, padlock shackle, or padlock body. In this way, the invention can transform virtually any key-based padlock or existing mechanical lock into a smart keyless button-based padlock or lock system (e.g., by adding a button, rose protector, and rose knob to a cylinder consistent with embodiments disclosed in the invention).

According to some aspects of the invention, the rose knob 318 further comprises a releasing mechanism that allows the rose knob 318 to be pressed inwards for further rotational movement. The release mechanism may be, for example, one or more moveable pins or pegs mounted inside the button. As described above, the rose knob 318 may be freely rotatable until a user provides valid authentication information, actuating the release mechanism. Thus, until the user is authenticated, the pins or pegs may be placed into a blocking position that prevents the rose knob 318 from being pushed inward. Once the user is authenticated, the pins or pegs are moved from their blocking position, allowing the rose knob 318 to be pushed inwards. Once pushed inwards, the rose knob 318 may engage the bolt or latch of the cylinder. Further rotation of the rose knob 318 may then cause the cylinder bolt to be opened or closed.

According to some embodiments of the invention, the rose knob 318 actuates the cam for a first series of turns, and after the first series of turns, it may actuate a latch of the cylinder. In this way, the rose knob 318 may also function as a door handle and be used to open and close a latch bolt. For example, a first series of turns may be used to engage or disengage the lock bolt. A second series of turns may then be used to open the latch of the lock, or if using a Euro-din cylinder, the turn will lock or unlock the cylinder.

According to some embodiments of the invention, the rotational movement of the rose knob 318 can also be used as a password mechanism in a similar manner as a rotating number lock may be used to open a combination safe. The rose knob may include a display with markings that have numbers or letters. The display may then be used to associate the rotational movement of the rose knob 318 with the numbers or letters of the display. Thus, a user may provide a dynamic or fixed passcode to open a lock by rotating the rose knob in accordance with and in reference to these markings to reach the required combination. The hardware processor may then be configured to validate authentication information based on the rotational movement of the rose knob, by associating the rotational movement of the rose knob with the numbers and letters of the display. The hardware processor may then determine the passcode that the rotational movement corresponds to, and then validate the passcode electronically as described above and below.

FIG. 3D shows the button is detachable from the cylinder in some embodiments of the invention. The detachable button may include a recharge interface 313 and input/output port ("I/O port") 314. The power source 302 may be a rechargeable power source, such as for example, a capacitor bank, a rechargeable battery, or similar device. As described in more detail below, the button may also include an energy harvesting element 316. By removing the button from the cylinder, a user may take the button to a recharging station 315 where its charge may be restored. Recharge station 315 may be coupled to a power outlet, where charge may be transferred through recharge interface 313 to the rechargeable power source 302. Recharge interface 313 may be, for example, a wire, plug, or one or more contact pins for receiving current from a recharge station 315 with a matching interface. When the recharge interface is coupled to a recharge station 315 with a matching wire, plug or contact pin configuration, the recharge station 315 supplies the button with power. Rechargeable power source 302 stores the charge received from the recharge station 315.

The button may also be charged through I/O port 314. I/O port 314 may be, for example, a USB, Firewire, Thunderbolt, e-SATA, Ethernet, or similar port for transferring power and/or data. In some embodiments of the invention, the I/O port 314 may receive power from an external device, such as a portable battery charger, with a matching interface that is enabled to deliver charge. For example, the external device may be a battery pack with a USB connection. In yet further embodiments of the invention, the I/O port 314 may receive power from a recharge station 315 with a matching port interface. Recharge station 315 may transfer power from a power outlet to the power source 302 of the button through I/O port 314.

Recharge station 315 may be coupled to master device 201, administrator device 202, or central access server 206. For example, recharge station 315 may include an Ethernet port or WiFi transmitter for establishing an internet connection and communicating to master device 201, administrator device 202, or central access server 206. While connected to I/O port 314, recharge station 315 may retrieve data stored in storage medium 301. As described above, such data may include, for example, information and data for validating authentication information, keeping access information such as logs of access events and smart lock usage, and identifying the smart lock. Recharge station 315 may then send the data retrieved from the storage medium 301 to master device 201, administrator device 202, or central access server 206. Thus, while the button is recharging, it may communicate access information to other devices or the central access server.

According to some embodiments of the invention, the I/O port may be used to connect the smart lock to a wireless modem. For example, a USB dongle, data card, or similar device for providing access to a cellular network may be inserted into the I/O port, enabling the smart lock to communicate to a master device, administrator device, or central access server over a cellular broadband connection.

In some embodiments of the invention, valid credentials are required in order to release the button from the cylinder. For example, the button may only be removed when a valid passcode or biometric scan has been received. In this way, when the button is disposed on the exterior face of the door, the button may not be stolen or removed by thieves or unwanted vandals. In other embodiments, the button may be configured to be removed from the cylinder without the need for providing credentials. For example, when the button is disposed on the interior face of the door, facing the inside of a home, the button may be removed at any time.

According to some embodiments of the invention, the smart lock includes a button disposed on the interior face of a door and a button disposed on the exterior face of a door, as shown in FIG. 3H. In this configuration, the button disposed on the interior face of the door may be removable and rechargeable while the button disposed on the exterior face of the door is neither detachable nor rechargeable. The external button thus draws power from the power source of the interior facing button. In this way, an energy-efficient dual button smart lock may be provided having an external button resistant to tampering from the outside.

As explained above, the tokens communicated by the mobile devices may contain a passcode, such as a dynamic passcode for single-time usage. In one aspect of the invention, the passcode may be generated and communicated from the mobile device automatically such that no interaction is required from the user. Specifically, a user's mobile device may determine or detect it is in the vicinity of a smart lock. For example, using the location-based capabilities of the mobile device, the mobile device may determine that the user is approaching a site. In some embodiments, the determination may be aided by analyzing past user patterns, and infer that the user is returning home from work and is on his or her way to open their home door. The mobile device may alternatively make this determination by using its NFC/Bluetooth or wireless capabilities. Upon detecting the lock, the mobile device may identify the lock and the site that the lock secures. The mobile device may then automatically communicate this information to the central access server to determine if the user is allowed to access the smart lock. If the user meets all the conditions for accessing the lock (e.g., the user is allowed to access the lock at the particular time and day), then the access control system will generate a dynamic passcode. The dynamic passcode may be generated at a master device, an administrator device, or the central access server and then transmitted to the mobile device, or alternatively, it is generated by a mobile application on the mobile device of the user. The mobile device may then transmit the passcode to the smart lock, which validates the passcode using a process stored in the lock. Once the passcode has been validated, the user may push the button inwards and engage or disengage the bolt using a clutch system. If the user is not allowed to open the lock, the administrator will receive a notification that an unauthorized user attempted to open the lock.

According to some embodiments of the invention, the button includes a light indicator 312 that changes color based on the mode of operation. For example, if authentication information has been accepted, the lighting glows green; if authentication information has been rejected, it glows red; in standby mode it glows blue.

As described above, the smart lock is powered by power source 302. In some embodiments of the invention, the button includes redundant power sources, as shown in FIG. 4. The redundant power sources may be used to energize the storage medium, wireless transceiver, and lighting indicator, in the event that one of the power sources fail. A redundant power source may be, for example, a bank of capacitors or batteries 401 located inside the button. When the batteries or capacitors are low on charge, the button may communicate this information to the next mobile device that accesses the lock. The mobile device may then communicate this information to a master or administrator. Alternatively, a low charge or battery level may be communicated using the color indicators.

In other embodiments, the button has a bank of capacitors 401 that are charged by the rotational movement of the button. The energy stored by the rotational movement is sufficient to last for several days, and provides a convenient, reliable, and redundant source of power should another power supply (e.g., batteries) fail. The button freely rotates about its central axis generating a high level of kinetic energy. Whereas some knobs are limited to quarter or half-turns, the button may be spun a full revolution. Similar to the winding of a crown on a watch, the rotational movement of the button is harvested and translated by elements inside the button into electrical energy, and stored for future use. The greater the number of revolutions the button is spun, the higher the charge that is stored inside the lock. In one exemplary embodiment, the rotational movement of the button drives a series of gears and springs 402 that transfer the rotational energy generated by turning the button. Because the springs and gears 402 inside the lock may be smaller than the button, the button can be spun at a lower speed and torque. Thus, the amount of force to energize the lock may be reduced by proportionately tailoring the size of the button to the gears and springs inside the lock.

In other embodiments, the rotational movement of the button is applied to a piezo element 403. When a user rotates the button, the rotational movement of the button is applied to a piezo element that generates piezoelectricity which is then transferred and stored in a capacitor bank or battery as charge. The piezoelectricity may be generated by strain, tension, or torsion from the spinning of the button. The strain, tension, or torsion is applied to the piezo element and creates electric charge that may be stored in a capacitor bank. In other embodiments, piezoelectricity may be generated by converting the rotational movement into vibrational energy. Specifically, the gears or springs inside the button may come into contact with a piezo flap that vibrates with every turn of the button.

In other embodiments, the rotational movement may additionally be converted into electrostatic or electromagnetic energy. For example, the rotation of the button may be used as the mechanical energy that rotates an armature in an electrical generator 404. In further embodiments, the rotational movement of the button may be stored in a spring or similar mechanical device.

Although FIGS. 3A-C and 4 depict several components inside the button, in other embodiments of the invention, these components may be placed outside of the button. For example, the wireless transceiver, memory, hardware processor, and capacitor/battery bank may be disposed outside of the cylinder and button in a lock case. These components may be coupled to the button through the cylinder. In other embodiments, these components may be inside the cylinder core, or inside a door rose.

Figure 5:
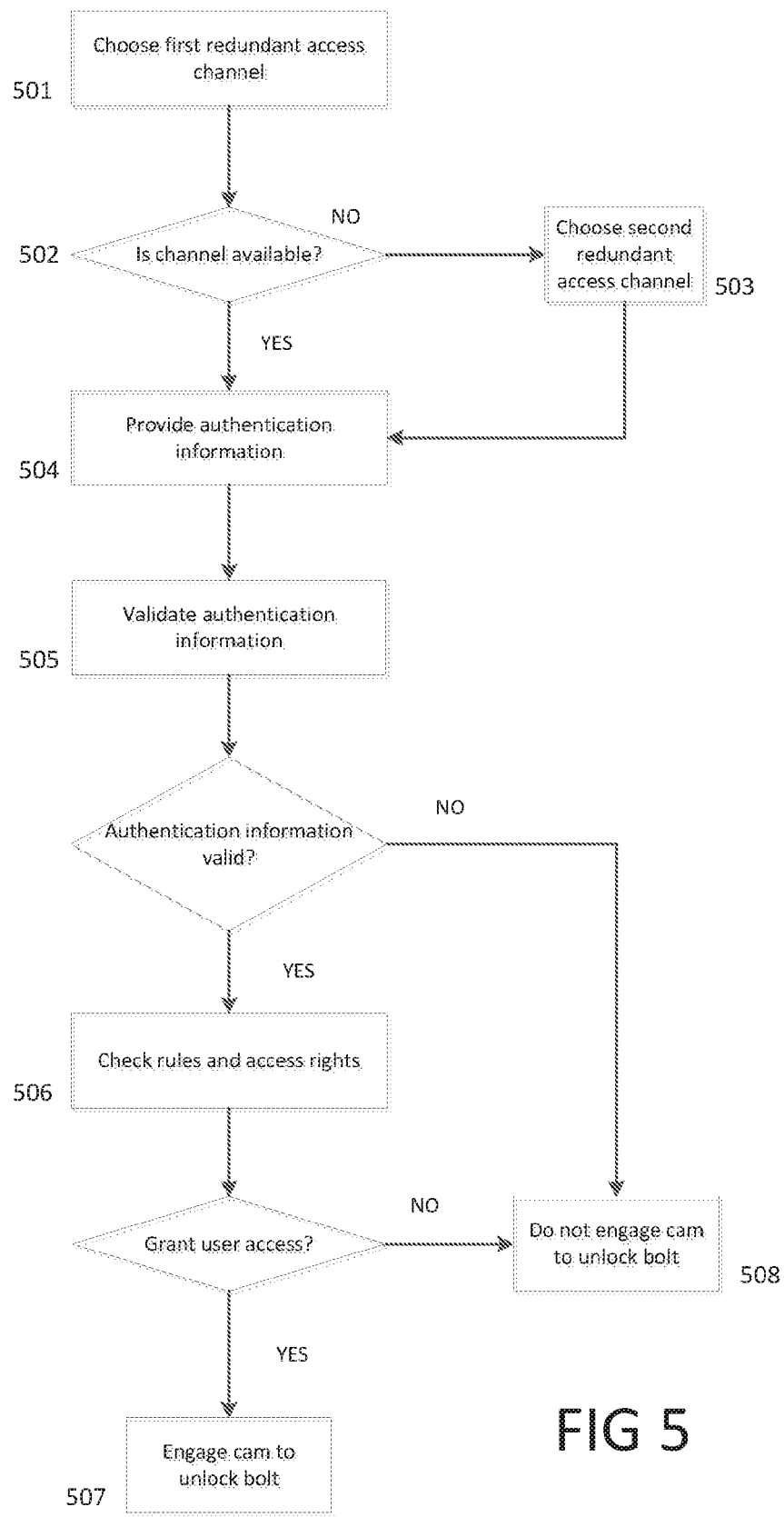
FIG. 5 shows a process for opening a smart lock according to embodiments of the invention.

FIG. 5 shows a process for using a lock with access channels according to embodiments of the invention. In step 501, a user chooses a first access channel. If the channel is available as shown in step 502, the user may provide authentication information 504. For example, if the access channel is wirelessly transmitting a token to the smart lock, it may be determined that the access channel is unavailable if, for example, the user's mobile device is lost, stolen, or drained. If the first access channel is unavailable, then a second redundant access channel is selected 503. For example, the second redundant access channel may be a biometric scan or passcode that is entered on the smart lock's keypad.

The smart lock validates the authentication information as shown in step 505. As described above, if the authentication information includes a token or passcode, the token or passcode is compared to a token or passcode produced by a process stored on the smart lock. If the authentication information is a biometric scan, then the scanned data is compared to biometric data stored at the smart lock. In this way, the invention provides redundant channels of access that ensures users can access a lock even when their mobile device is lost or inoperable.

If the authentication information is validated, then the access rights are checked to determine whether the user is authorized to access the smart lock, as shown in step 506. For example, it is determined whether the master or administrator allowed the user access to a smart lock at the given day or time. If the user is authorized to open the lock, then the user is granted access, and the button may engage the cam to open the smart lock 507. If the authentication information is not valid, or the master or administrator decided to deny the user access to the lock, the button will not engage the cam and open the smart lock 508. As described above, the rules and access rights may be checked at the user device, the central access server, the master device, or the administrator device.

Figure 6:
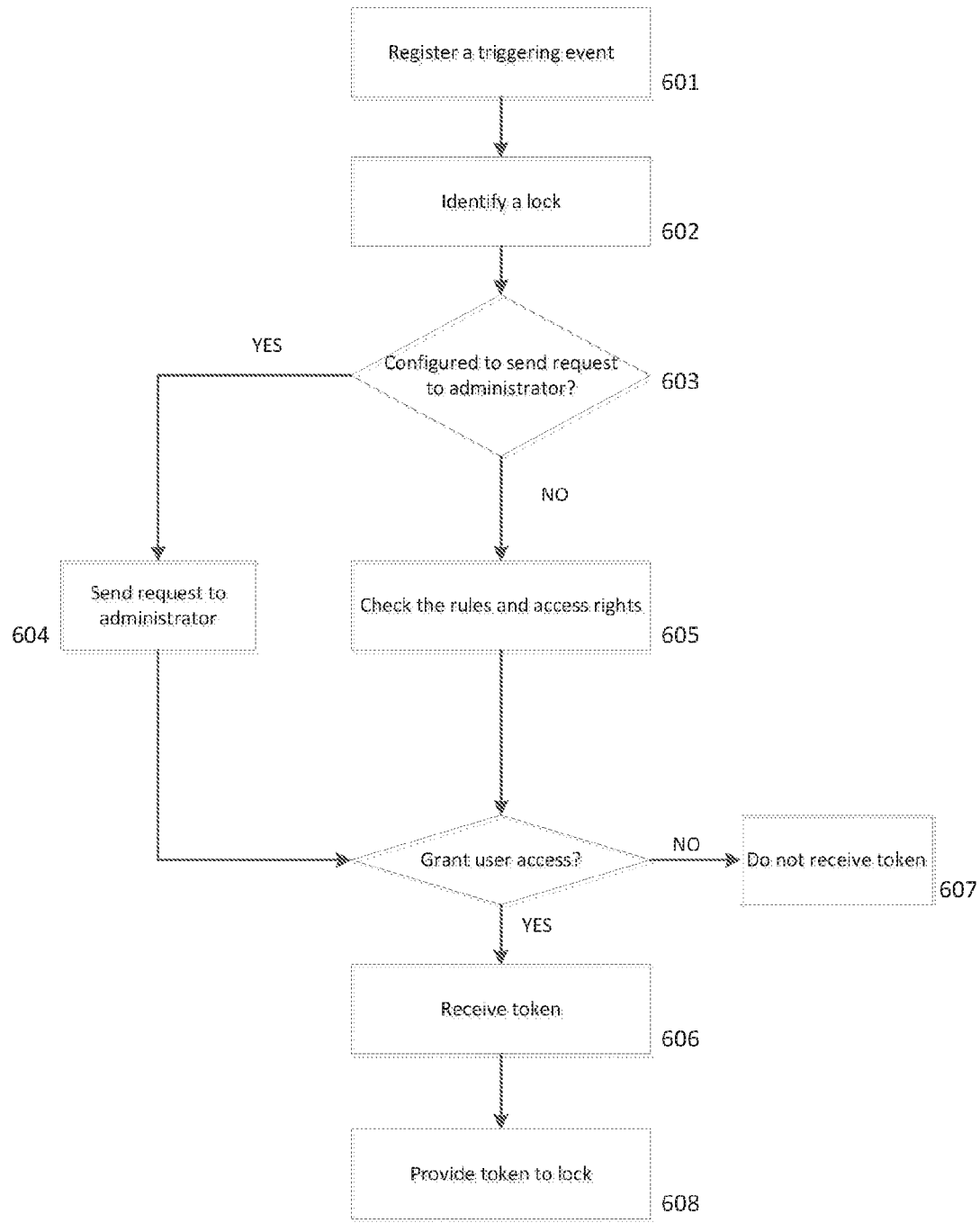
FIG. 6 shows a process for registering triggering events in an access control system according to embodiments of the invention.
Figure 7:
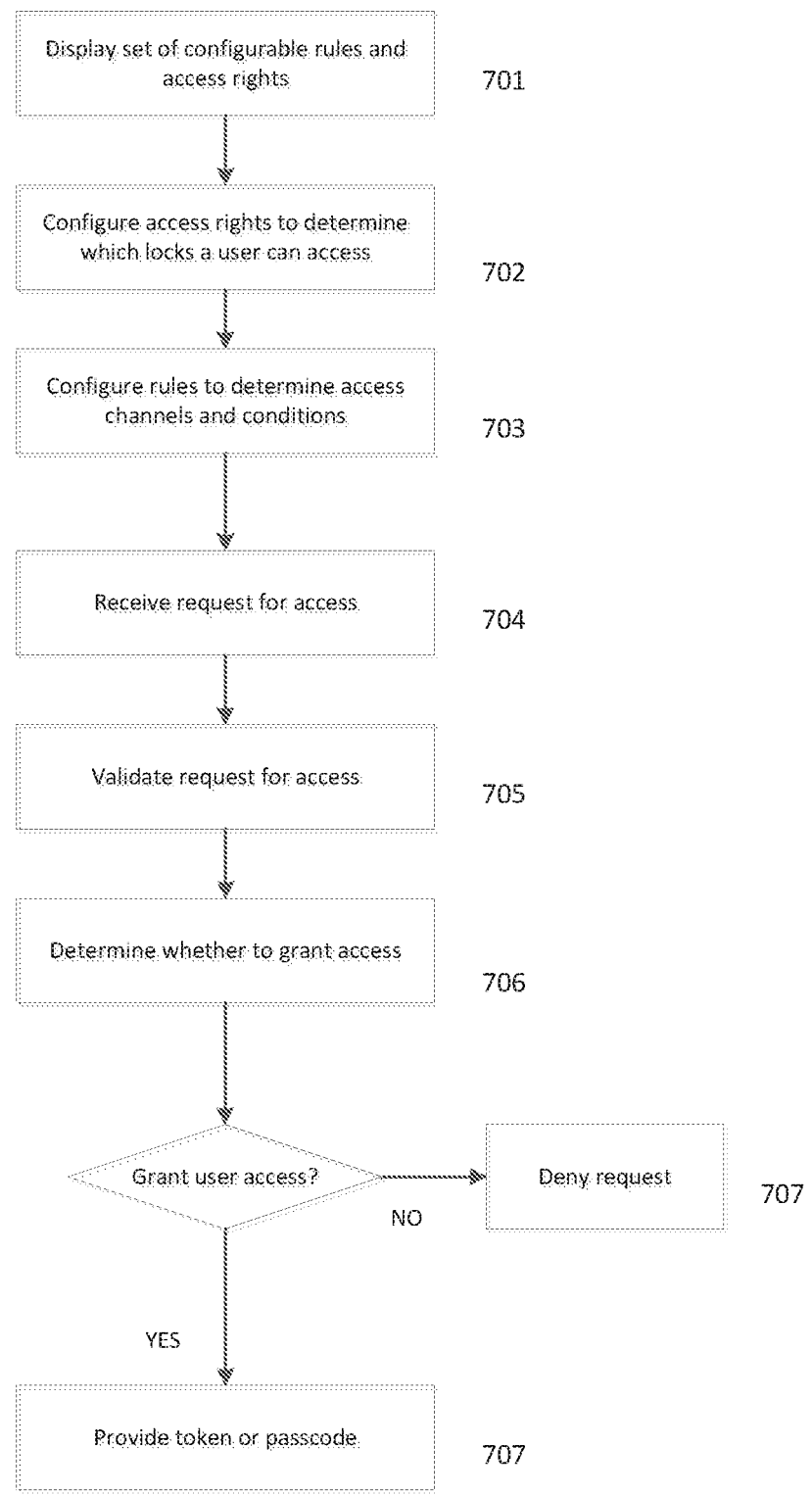
FIG. 7 shows a process for controlling access to smart locks in an access control system according to embodiments of the invention.

FIG. 6 shows a process for controlling a lock with access channels according to embodiments of the invention. In step 601, a triggering event is registered. Triggering events may be used to initiate the process of opening a smart lock automatically. A triggering event may be for example, when a user's mobile device has come within a predetermined distance (e.g., 10 feet) of the smart lock. The triggering event may then, for example, cause the mobile device to automatically transmit a token to the button.

Triggering events may be registered based on other capabilities of the mobile device. For example, if the mobile device has gesture recognition sensors and software, a triggering event may be registered based on when the user shakes his or her mobile device in a particular way. Alternatively, the mobile device may register a triggering event when the user selects a button or enters a code on a mobile application on the mobile device.

After the mobile device registers a triggering event, the mobile device identifies the smart lock it is opening, as shown in step 602. It is then determined whether the rules are configured to grant the user conditional access rights or fixed access rights, as shown in step 603. If the user has conditional access rights, then the mobile device will submit a request to the master or administrator as shown in step 604. Otherwise, the rules and access rights are evaluated to determine if the user is authorized to open the lock at step 605.

As described above, a mobile device may submit a request to an administrator in several ways. For example, the mobile device may submit a request to a master device, an administrator device, or a central server using its data connection, by sending a text message, or by placing a call to the central access server with a call center. In some embodiments of the invention, the master, administrator, or central access sever may require the user provide additional credentials before issuing a token. For example, the request submitted by the user's mobile device may include the user's location, password, or other similar identifying credentials, such as their phone number or email address. As another example, the additional credentials may include the GPS coordinates of the user's mobile device that corroborate that the user is at the location of the smart lock. In other embodiments, the user may also be required to take a picture of the smart lock and provide it with the request to prove the user is located at the location of the smart lock. After the credentials are successfully validated, a token is sent to the user's mobile device.

If the master or administrator approves the user's request, or the user has sufficient access rights to open the lock, then the user may receive a token as shown in step 606. If the master or administrator denies the user's request, or the user is unauthorized to open the lock, the user will not receive a token, as shown in step 607.

The user may then provide authentication information to the smart lock, as shown in step 608. If the user will be opening the lock by entering a passcode on the keypad, the user may for example, receive the passcode as a text message, or displayed on a mobile application, which the user can enter on the smart lock keypad. If the user's mobile device will be wirelessly transmitting the token to the smart lock, then the mobile device may transmit the token automatically, once it is received.

In one aspect of the invention, additional layers of security may be required before the authentication information may be provided to the smart lock. For example, a user may be prompted to enter a password into the mobile device before it will wirelessly transmit the authentication information to the button. In other embodiments, the rules may be configured to require the user to scan his or her fingerprint on the mobile device before receiving a token. As described above, the mobile device may also automatically transmit the authentication information without further interaction from the user. For example, the mobile device may transmit the authentication information upon launching a mobile application.

In some embodiments, the button may be a part of an inter-connected hub of devices that may be controlled from a single interface and are automated based on events occurring in the access control system. For example, the inter-connected network of devices may include a home thermostat, lighting system, sound system, and access control system which communicate wirelessly over WiFi or Bluetooth. The home thermostat, lighting system, sound system, and access control system may communicate to each other or to a central server using the same Application Programming Interface ("API"). Using the API, the home thermostat, lighting system, sound system, and access control system may be automated based on certain rules or events. For example, after a user unlocks his home door with his mobile device, the access control system may communicate user preferences to the thermostat to turn on the air conditioner at a certain temperature, to turn on certain lighting fixtures in the living room, and start playing specific user-defined music over the speaker system.

In some embodiments, the movement or position of the door as described above may register a triggering event that causes an interconnected hub of devices to perform certain tasks or sequences of tasks. For example, when it is determined that a door has been opened, a triggering event may be registered to communicate to the thermostat to turn on the air conditioner at a certain temperature, to turn on certain lighting fixtures in the living room, and start playing specific user-defined music over the speaker system.

FIG. 6 shows a process for enabling a master or administrator to control an access control system. In step 701, a set of configurable rules and access rights is displayed to a master or administrator. In step 702, the master or administrator configures access rights to determine which smart locks a user may access. In step 703, the master or administrator configures rules that specify which access channels a user may use to open a smart lock, and what (if any) conditions must be satisfied before opening the smart lock.

When a user who has conditional access rights submits a request to open a smart lock as described above, a master or administrator receives a request for access, as shown in step 704. For example, a request may be received in the form of a text message, phone call, or as a notification displayed on a mobile application of the master or administrator. The request may be received directly from a user, or it may be received from the central access server, which received the request from the user.

In step 705, the user request is validated. The user may be validated by, for example, requesting the user provide additional credentials, such as a password. As another example, the master or administrator may obtain the ID of the user's mobile device to determine if the mobile device has been reported as lost or stolen. If it is stolen, the rules may be configured to automatically deny the request for access and notify the master, administrator, or user of the attempted use.

If the master or administrator validates the user, then the master or administrator may proceed to step 706, where the master or administrator determines whether to grant access to the user. In this step, the rules and access rights may be checked to determine if the user is authorized to open the particular lock and if there are any conditions that must be met before opening the lock. For example, it may be determined that the user is not authorized to open the particular smart lock, or is not authorized to open the smart lock on the particular day. If the user is authorized, the master or administrator may still decide to deny the user access. For example, a master or administrator may prefer to use his or her discretion in approving requests even if the user is authorized. If the master or administrator determines to approve the request, then a token or passcode is generated and provided to the user. The token or passcode may be transmitted to the user as described above. For example, the token or passcode may be sent in the form of a text message, phone call, or as a notification displayed on a mobile application of the user. The token or passcode may then be provided to the user at step 708.

According to some embodiments of the invention, a mobile application may be installed on the master device, administrator device, or user's device, for controlling an using the access control system. The mobile application for masters or administrators may provide an interface to: view access information; create access rights; view access logs; manage user rights; open a lock; and create reports of successful entries, and refused entries, including details of why entry was refused (e.g., the user accessed the lock outside of the timeframe or date it was permitted to access the lock, or was not allowed to open the lock in the first instance). In this way, the access control system provides the safety and reliability benefits of a mechanical lock and key system, while also providing the reporting and real-time value-added services of mobile devices and electronic lock systems. Similarly, the mobile application for users may provide an interface to: receive access alerts; request access rights; view access logs; and open a lock.

Figure 8A:
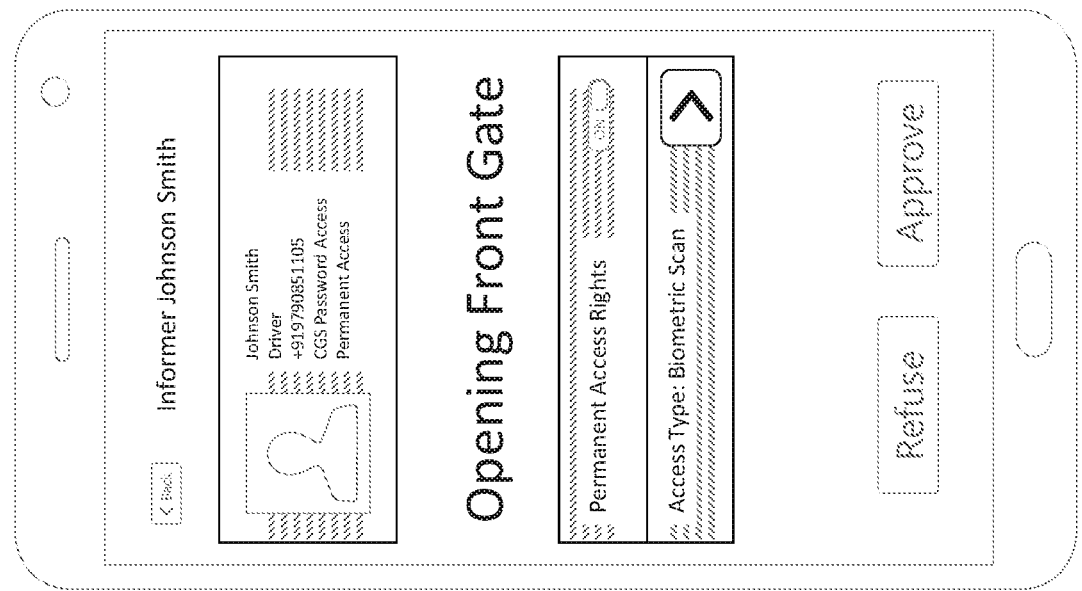
FIGS. 8A, 8B, 8C, 8D, and 8E show interfaces for controlling access to smart locks in an access control system according to embodiments of the invention.

In one aspect of the invention, the mobile application provides an "informer" feature as shown in FIG. 8A, which informs masters, administrators, and users about information related to access events and access rights. For masters and administrators, the mobile application will receive information about access events, such as when a user accesses a lock. As shown in FIG. 8A, the feature provides an alert to the master or administrator that Johnson Smith wishes to open a gate, is in close proximity to a gate, or is attempting to open a gate. The alert notifies the master or administrator of the access event or change in access rights in near real-time. Because the events can be communicated quickly to the master or administrator, the mobile application may additionally provide the master or administrator the option to deny the user from accessing the secured site in near real-time. Similarly, the mobile application may also receive alerts when a user attempts to open a lock with invalid authentication information (e.g., an incorrect passcode).

Using the wireless or location-based capabilities of the mobile device, the mobile application can determine the length of time that a user stays at a secured site. The mobile application may also receive information from the button about when it was locked and unlocked to determine when the user gained access and subsequently left a secured site. As explained in more detail below, the button on the lock will also transmit its lock/unlock status to a user's mobile device. The user's mobile device may then transmit the lock/unlock status to the central access server, which may then send a notification to a master or administrator about the status of the lock. In this way, after a user has subsequently left a secured site, a master or administrator may be alerted that the site is still unlocked, and may contact the user informing him or her that they forgot to lock the site.

Figure 8B:
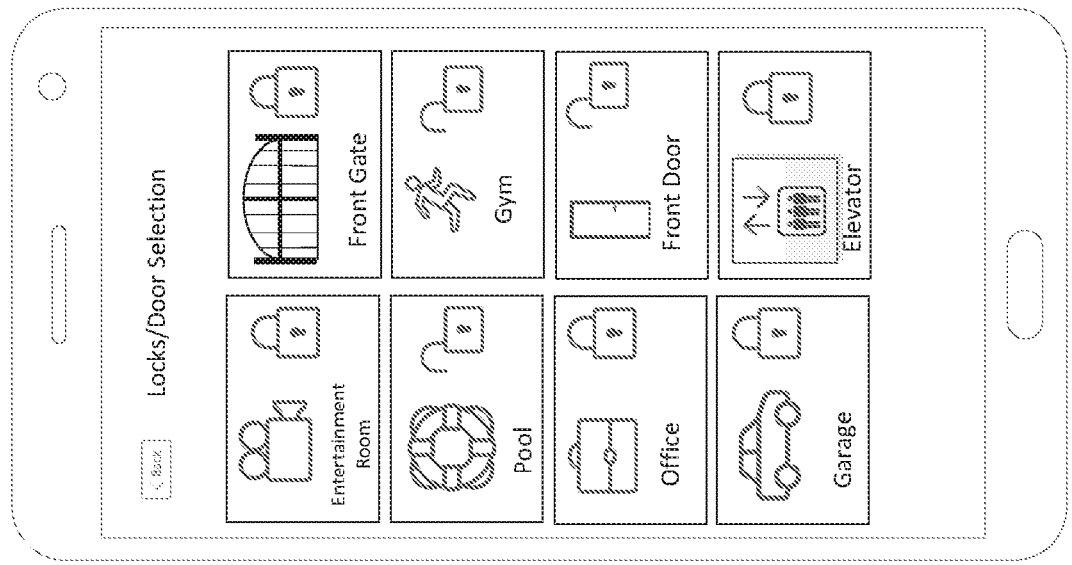

In one aspect of the invention, the mobile application may display to a master or administrator which areas of a secured site have been locked or unlocked, as shown in FIG. 8B. When a user unlocks or locks a site with their mobile device, the mobile device communicates the information to the central access server. The central access server then provides the lock/unlock status to masters or administrators. When the user locks or unlocks a site using an alternative channel of access, the information is stored on the smart lock and communicated to the central access server the next time a mobile device is used to open the smart lock.

Figure 8C:
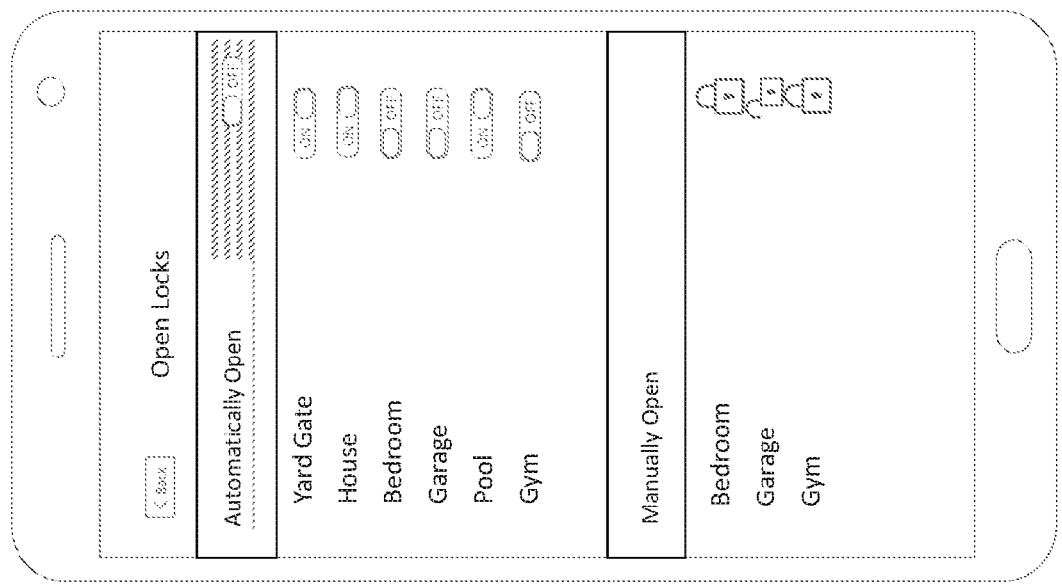

The mobile application is also programmed to provide a user interface for displaying and configuring how these sites may be unlocked. For example, as shown in FIG. 8C, the mobile application can show whether a site may be opened automatically or manually.

Figure 8D:
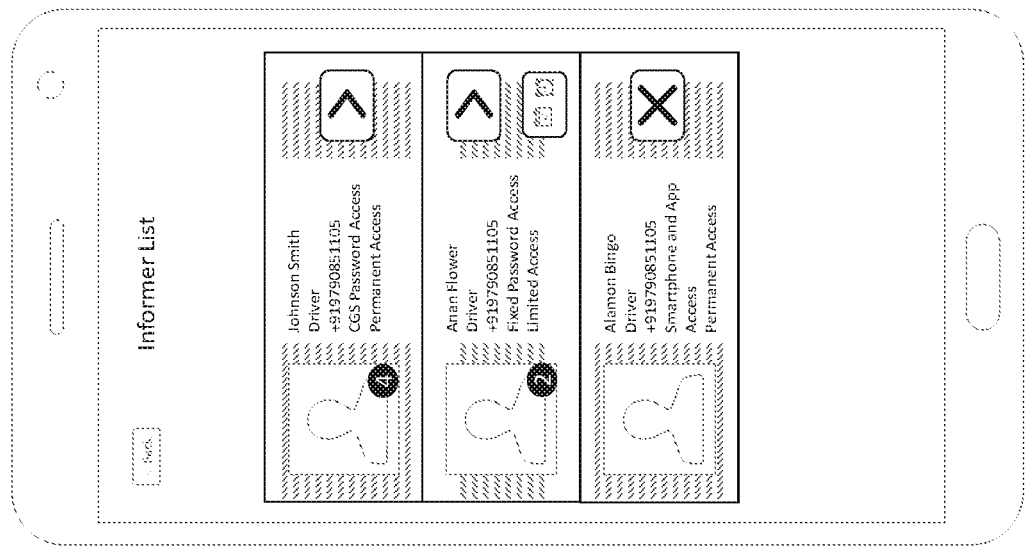

Another interface of the mobile application provides a display of which users have access to a lock. As shown in FIG. 8D, the interface displays a picture of each user, and their personal information such as name and contact information. Each user on the list may be selected or deleted. Selecting the user causes the mobile application to display another interface that shows additional details about the user.

Figure 8E:
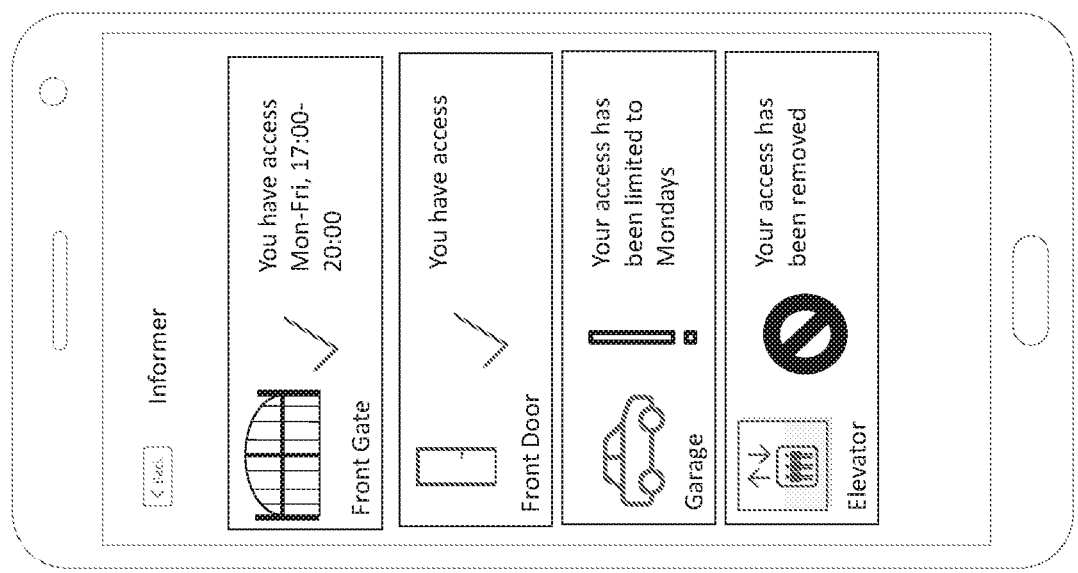

In one aspect of the invention, the informer will display alerts and messages in connection with changes made to a user's access rights. As shown in FIG. 8E, the informer may alert a user that he or she has access rights to a particular site (e.g., Gate A) at a specific time (e.g., from Monday to Friday from 5:00 pm to 8:00 pm). Similarly, the informer may notify the user that he or she received new access rights to a particular area, or that those access rights have been limited, or revoked.

While FIGS. 8A-8E demonstrate the alert and messaging functionality of the informer using the mobile application interface, alerts and messages regarding access rights may also be communicated to the users via SMS text, e-mail, or by a phone call. Thus, for example, when user access rights change, the user may receive an SMS text informing the user his or her access rights have been changed.

In one aspect of the invention, the mobile application provides an "authorization" feature, which enables masters and administrators to create and change users' access rights, and allows users to request access rights. Access rights for each user are stored in the master device, administrator device, or central access server, where each user's attempt to access a lock may be validated.

Figure 9A:
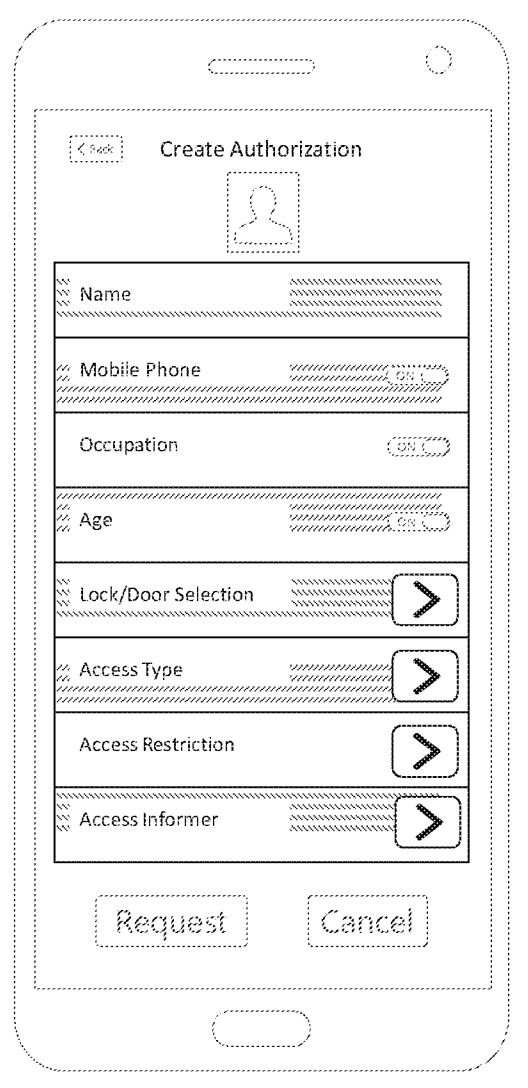

As shown in FIG. 9A, the mobile application may provide an interface for masters or administrators to create user access rights and rules. For example, the interface allows the master or administrator to specify the user's contact information (e.g., name, phone number, occupation, age), the particular individual locks that the user will have access to, the access channels the user may use (e.g., passcode, biometric scan, wirelessly transmitting a token to the smart lock, or any combination of thereof), and conditions to the user's access (e.g., restrictions on the time of the day). The authorization feature of the mobile application is available to masters and administrators. In some embodiments of the authorization feature used by administrators, after providing the access information the administrator submits the information as a request to the master. The information is then communicated to a master who ultimately approves or denies the creation of access rights for the new user. The creation of access rights may happen in near real-time; when a master approves a user's request or an administrator's request, the user may immediately begin using their mobile device, passcode, or biometric scan to access the designated smart locks.

Figure 9B:
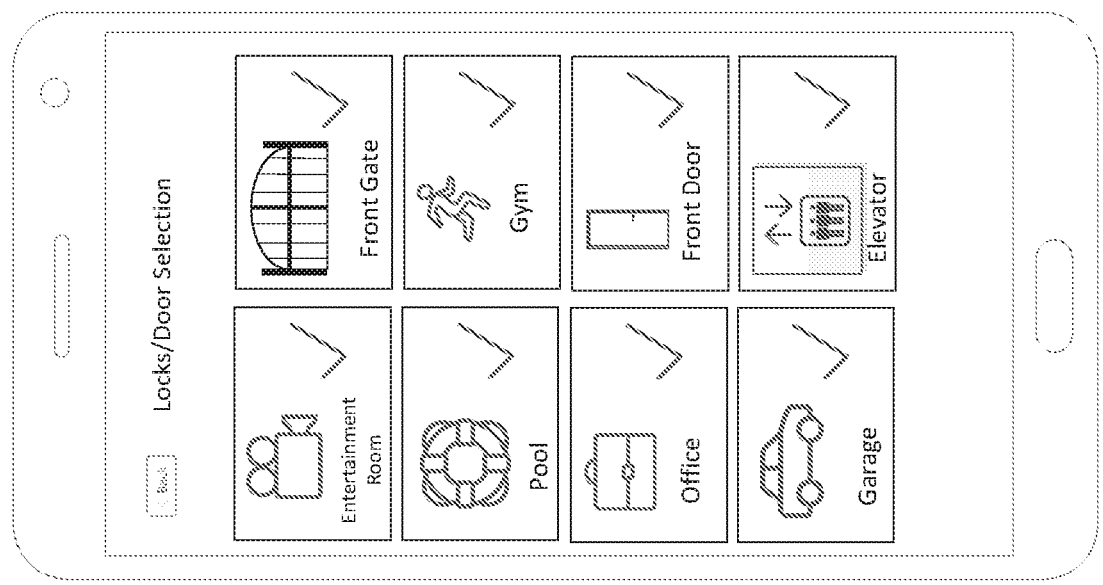

In one aspect of the invention, the master or administrator can specify a particular lock, area, or door within a site, as shown in FIG. 9B. As FIG. 9B shows, a master or administrator can select locked areas such as a front gate, gym, entertainment room, or office to grant access to a user. The mobile application enables this configuration to occur remotely and in near real-time; a master or administrator is not required to be on-site to make a key copy or update any records thereby causing delay.

The status may correspond to the information received from the sensors described above that correspond to a door being opened or closed, and a bolt being locked or unlocked.

Figure 9C:
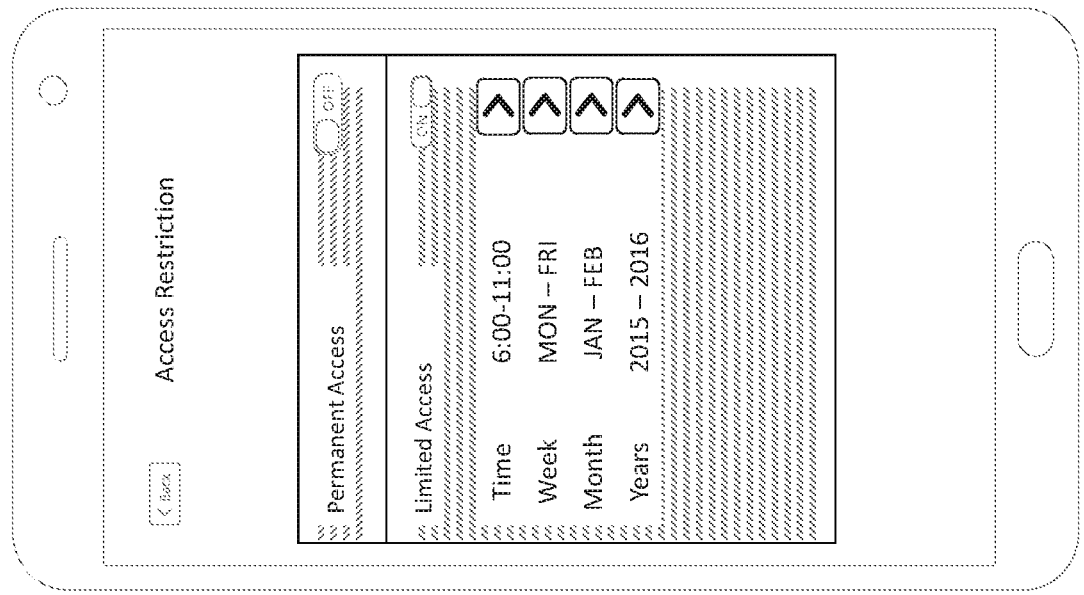

As described above, the authorization feature allows masters or administrators to add restrictions to a user's access. As shown in FIG. 9C, a master or administrator may allow a user to have permanent indefinite access, or may limit the user's access to be temporary, or may limit the access to be during select intervals throughout the day, week, month, or year.

The authorization feature may additionally allow a master or administrator to provide one-time access on a case-by-case basis. A user may receive one-time access by sending a request to a master or administrator as described above. The request may be via the mobile application's authorization interface for users, SMS text, e-mail, or by phone call. The request can be for a particular lock or group of locks, and for a particular access type. The master or administrator may determine in near real-time to grant or deny the request. If the master or administrator approves the request, the user can open the lock. Using the recording and reporting functionality the master or administrator can determine when the user has finished using the lock, and disable or remove the user's access rights. Alternatively, if the master or administrator decides to grant the user access, the master or administrator may provide the user with a dynamic passcode that can only be used once, and expires after it has been used.

Figure 9D:
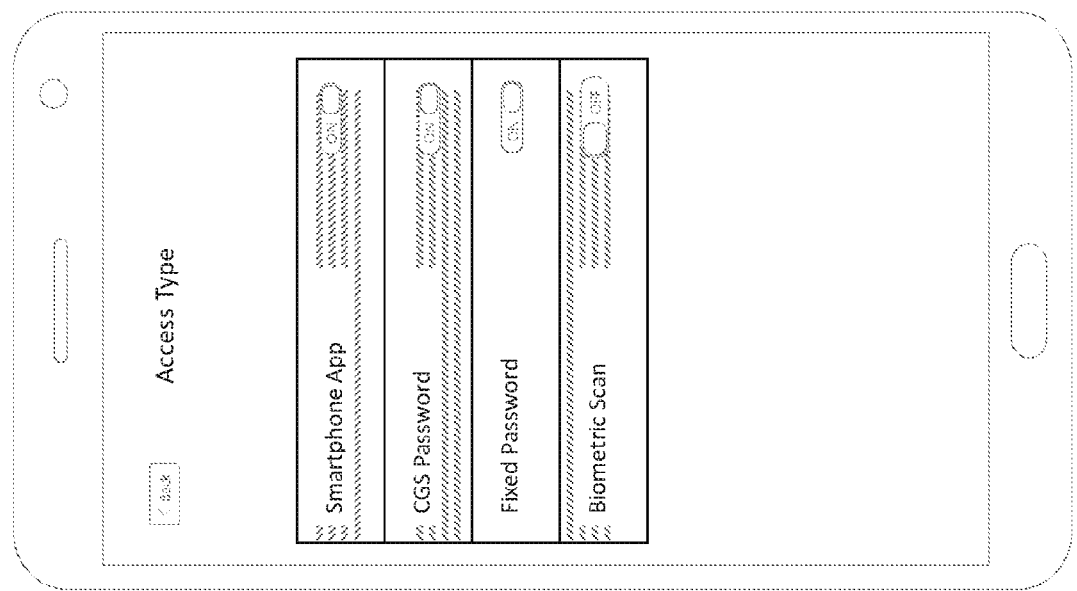

An access type interface, as shown in FIG. 9D allows a master or administrator to configure the rules to specify what access channels are available to a user for opening a smart lock. For example, the master or administrator can specify whether the user can open a smart lock by wirelessly transmitting a token to the smart lock, entering a passcode on the keypad, using a biometric scan, or any combination thereof. The master or administrator may also add conditions limiting when a user may access a smart lock, such as, adding time or date restrictions. For example, a master or administrator may specify that a user can access a lock with a smartphone or mobile device Monday through Friday, but on weekends must additionally provide a biometric scan or passcode.

In one embodiment of the invention, a master or administrator may add a user's biometric scan to a smart lock using their respective mobile devices. For example, a user may scan their fingerprint on their smartphone and send it to the master or administrator via SMS text or the mobile app. The master or administrator may then add the fingerprints to the central access server, or the smart lock the next time their mobile device communicates to the smart lock. In this way, a new user's biometric scan can be added to a smart lock remotely, without the user previously being located at the smart lock.

A user may send a request for access rights using the mobile application on their mobile device. After registering, the user may load a list of sites and their corresponding locks and request access from the smart lock's corresponding master or administrator. The user may search for a master or administrator and request access rights directly from them. As an alternative to using the mobile application, the user may request access by SMS text, e-mail or by phone call.

Figure 9E:
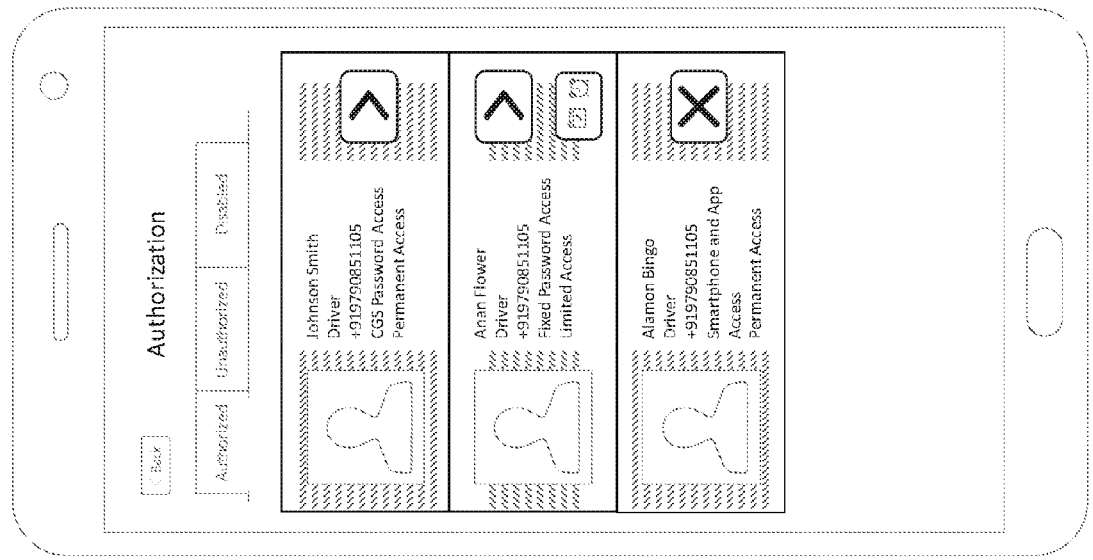

A master or administrator may modify the access rights of each user through the authorization interface at any time, as shown in FIG. 9E. In one aspect of the invention, the access rights may be modified without notifying or informing the users. In this way, the master or administrator may change or delete the access rights associated with a mobile device remotely and without requiring any access or interaction with the user. Thus, if a mobile device is stolen or lost, a master or administrator may disable that particular mobile device, preventing it from being used by unauthorized persons or in unwanted manners. Before a mobile device may be disabled, the master or administrator may be prompted for additional credentials to authenticate his or her identity. If the disabled phone is subsequently used to access a smart lock (e.g., by a thief or an unwanted person), the smart lock will reject it and the master or administrator will be informed of the unauthorized attempt at access. As shown in the exemplary illustration below, the authorization interface allows masters or administrators to de-authorize users, disable users or remove them from a lock altogether. These changes to a user's access rights can be effectuated in near real-time.

In one aspect of the invention, the mobile application provides a "reporting" feature, which enables masters and administrators to view records and logs of access events for each user or each lock. Records of various access events, such as when and how a user sought or obtained access to a smart lock, may be stored in the storage medium of the button as described above or in the mobile application of the of the user's mobile device. For example, when a user seeks or obtains access to a smart lock using his or her mobile device, a record of that access event may be stored in the mobile device or in the button. Similarly, if the user is accessing the smart lock via a redundant access channel (e.g., a passcode or biometric scan), the access event may be stored in the button, and will be wirelessly communicated to the central access server at a later stage when another mobile device is in contact with the smart lock.

Access events may further include information received by the sensors described above indicating whether a door has been opened or closed, or the bolt has been locked or unlocked.

Figure 9F:
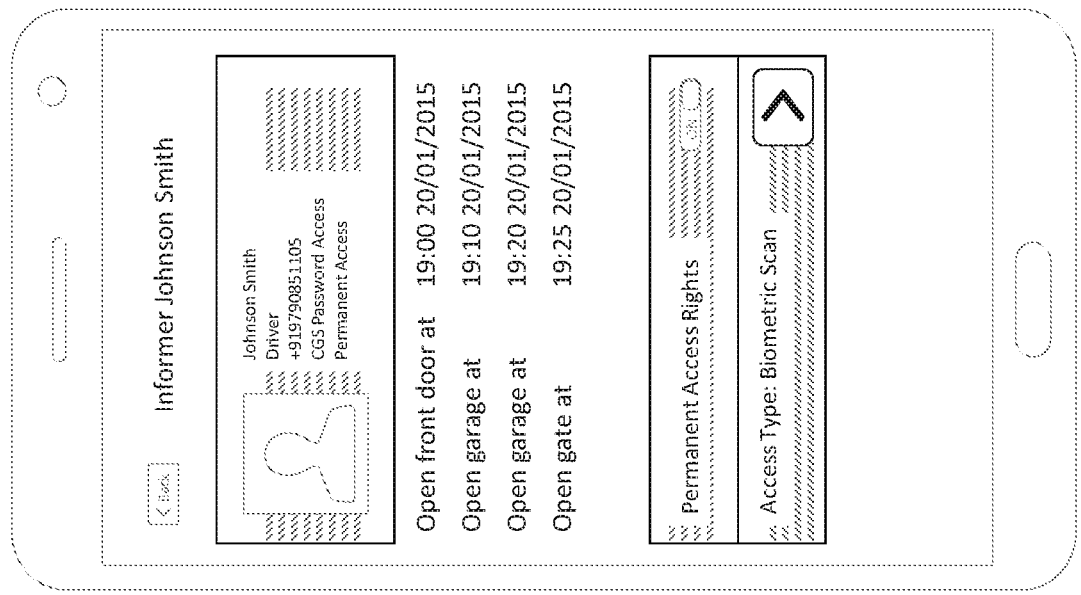

Logs of the access events for each user or each smart lock may be compiled and communicated to a master or administrator on a periodic basis, or in near real-time. For example, as shown in FIG. 9F, a log of a user's access events for the day may be compiled and reported to a master or administrator. The logs show the details of each access event for a particular user, such as what smart lock was accessed, how it was accessed, and the precise time the user accessed it and how long the user spent on site. Logs can further include records of successful and unsuccessful openings of smart locks, the time periods that users are allowed to open smart locks, and when users requested access to smart locks. Similar logs can be compiled for each smart lock, reporting who accessed the smart lock, how it was accessed, and when it was accessed. Masters and administrators can configure how frequently they prefer to receive reports of logs. Reports can be communicated to the central access server, or communicated directly to a master or administrator.

In other embodiments of the invention, the logs may be communicated directly from the smart lock to an administrator or central server, bypassing the mobile device. As explained above, the smart lock may communicate this information directly to the central server or administrator using its wireless connection, or through a network device.

In one aspect of the invention, the logs and reports may be processed to discover patterns about access usage and users. Specifically, the logs and reports can be mined to detect patterns relating to how and when users access different smart locks. Using these recognized patterns of access behavior, the access control system may then predict access events to enhance system security or access control. For example, if the logs and reports indicate that a user enters a home from the front gate at 5:00 pm every weekday, the access control system may automate processes or tasks in inter-connected devices, such as communicate to the lighting system to activate the lights on the front patio, the thermostat to start the air conditioner.

FIGS. 10A-10C illustrate user interfaces for logging into the mobile application, requesting a token or passcode, and receiving a token or passcode. As described above, a user may be required to provide credentials as shown in FIG. 10A, such as a password, before being allowed to request a token or passcode. As shown in FIG. 10B, the interface allows the user to view which smart locks they may access, and if they do not have access to a smart lock, or only have conditional access rights, they may submit a request to a master or administrator. As FIG. 10B shows, a user may submit the request in several ways, such as for example, by sending an alert to the mobile application on the mobile device of the master or administrator, or by sending them a text or placing a call. As shown in FIG. 10C, if the user has been validated and approved for access by a master or administrator, the user will receive a token or passcode. If the user receives a passcode, they passcode may be displayed for the user to enter onto the keypad. If the user receives a token, the token may be wirelessly transmitted to a smart lock.

In further aspects of the invention, user patterns discovered with the logs may be used to optimize certain components of the smart lock. For example, the logs may be used to determine when a user typically leaves and arrives home.

With this information, the smart lock may determine certain periods when the smart lock is least likely to be used, and may therefore change some of its functions or its mode of operation. For example, the smart lock may determine that no one typically enters or leaves the home during business hours of a weekday. During this period, the smart lock may enter into a "sleep" mode, where the smart lock deactivates certain features to reduce its power consumption.

Variations, modifications, and other implementations of what is described herein may occur to those of ordinary skill in the art without departing from the spirit and scope of the present invention and its claims.

We claim:

1. A lock for providing redundant channels of access comprising:
    a hardware processor;
    a power source;
    a cylinder adaptable to fit a standard profile slot of a door, the cylinder comprising a cam to engage a bolt;
    a button for engaging the cam to unlock the bolt and for forming a rose knob for protecting and concealing the hardware processor, the power source, and the cylinder; and
    a rose protector for protecting and concealing the hardware processor, the power source, and the cylinder, such that the hardware processor, the power source, and the cylinder are entirely protected and concealed by the rose knob and the rose protector,
    wherein the rose protector has an outer wall and an inner wall forming an annular groove for interlocking with the rose knob, the inner wall formed substantially perpendicular with respect to the door, the outer wall formed conically with respect to the door, the annular groove having a graduating thickness that decreases along a plane normal to the door as a result of the conical shape of the outer wall, wherein the shape of the outer wall deflects a strike of brute force,
    wherein the rose knob has an exterior surface and an interior surface, the exterior surface and interior surface forming: 1) an annular rim for interlocking with the annular groove of the rose protector, the annular rim having a thickness that matches the graduating thickness of the annular groove; and 2) an opening comprising the power source, the hardware processor, and a plurality of redundant access channels for receiving authentication information, the redundant access channels comprising a biometric scanner for receiving biometric information, a passcode keypad, and a wireless transceiver configured to communicate in near real-time with a mobile device,
    wherein the rose protector has a set of through-holes for one or more securing rods and one or more fasteners that secure the rose protector to the door, and when the annular rim of the rose knob slidably interlocks with the annular groove of the rose protector, the rose knob is irremovably secured to the rose protector,
    wherein the rose knob is freely rotatable until valid authentication information is received from the passcode keypad, biometric scanner, or mobile device, upon which the rose knob is configured to actuate the cam to unlock the bolt, and
    wherein the hardware processor is configured to validate authentication information received from the passcode keypad, biometric scanner, or mobile device based on a set of rules determined by an administrator, unlock the bolt when a user is authenticated through a first channel of the plurality of redundant access channels, and when the user cannot open the lock through the first channel, allow access through a second channel of the plurality of redundant access channels.

2. The lock of claim 1, wherein the cylinder is a double entry cylinder allowing for keyed access from two sides, wherein the hardware processor is a first hardware processor, the power source is a first power source, the rose protector is a first rose protector, and the rose knob is a first rose knob, the lock further comprising:
   a second hardware processor;
   a second power source;
   a second button for engaging the cam to unlock the bolt and for forming a second rose knob for protecting and concealing the second hardware processor, the second power source, and the cylinder,
   a second rose protector for protecting and concealing the second hardware processor, the second power source, and the cylinder, such that the second hardware processor, the second power source, and the cylinder are entirely protected and concealed by the second rose knob and the second rose protector; and
   wherein the second rose protector has an outer wall and an inner wall forming an annular groove for interlocking with the second rose knob, the inner wall formed substantially perpendicular with respect to the door, the outer wall formed conically with respect to the door, the annular groove having a graduating thickness that decreases along a plane normal to the door as a result of the conical shape of the outer wall, wherein the shape of the outer wall deflects a strike of brute force,
   wherein the second rose knob has an exterior surface and an interior surface, the exterior surface and interior surface forming: 1) an annular rim for interlocking with the annular groove of the second rose protector, the annular rim having a thickness that matches the graduating thickness of the annular groove; and 2) an opening comprising the second power source and the second hardware processor,
   wherein the second rose protector has a set of through-holes for one or more securing rods and one or more fasteners that secure the rose protector to the door, and when the annular rim of the second rose knob slidably interlocks with the annular groove of the second rose protector, the second rose knob is irremovably secured to the second rose protector, and
   wherein the first rose protector and the first rose knob are disposed on the exterior of the door, and the second rose protector and the second rose knob are disposed on the interior of the door.

3. The lock of claim 2, wherein the second rose protector is fastened to the first rose protector by one or more securing rods and one or more fasteners, wherein the one or more fasteners are inserted from the second rose protector, and are concealed from the exterior side of the door.

4. The lock of claim 1, wherein the rose knob has a frustum, and wherein the biometric scanner for receiving biometric information and the passcode keypad are disposed on the frustum.

5. The lock of claim 1, wherein the rose knob and the rose protector are constructed of stainless steel.

6. The lock of claim 1, wherein the rose knob has a finished surface, the finished surface having a coating that substantially reduces the rose knob's coefficient of friction.

7. The lock of claim 1, wherein the lock is a lock selected from the group consisting of a mechatronic lock, a mechanical lock, and a padlock.

8. The lock of claim 1, wherein the rose knob actuates the cam to unlock the bolt upon validating authentication information by actuating a release mechanism that moves from a blocking position to an unblocking position, enabling the rose knob to be pushed inwards and engage the cam upon further rotation.

9. The lock of claim 1, wherein the rose knob actuates the cam for a first series of turns, and after the first series of turns, actuates a latch of the cylinder.

10. The lock of claim 1, further comprising a numeric display that associates the rotational movement of the rose knob with an alphanumeric display, and wherein the hardware processor is further configured to validate authentication information based on the rotational movement the rose knob, wherein the rotational movement of the rose knob is associated with the alphanumeric display and corresponds to a passcode, and wherein the hardware processor validates the passcode electronically.

11. An access control system for providing redundant access channels comprising:
   the lock according to claim 1;
   a user mobile device configured to request access to the lock;
   an administrator device for controlling the user mobile device's access to the lock, the administrator device being configured to grant or deny the request for access in near real-time, wherein upon being granted access to the lock, the user mobile device is configured to receive authentication information comprising a token for opening the lock, and to provide the token to the lock; and
   wherein the lock comprises a storage medium for storing access information, and the lock is configured to transmit a response comprising the stored access information.

12. The system of claim 11, wherein the response transmitted from the lock comprises an access record indicating whether the token was accepted by the lock and that the lock was opened, and wherein the step of transmitting the response comprises transmitting the response from the user mobile device to the administrator device in near real-time.

13. The system of claim 11, wherein the administrator device is configured to grant access to the user mobile device based on a set of configurable rules and wherein the set of configurable rules comprises:
   a user role that is associated with a set of permissions to one or more locks, the set of configurable rules restricting access to a user based on the user's location, time the lock is being accessed, and the user's role; and
   a triggering event, the mobile device automatically sending a request for access to the lock based upon the mobile device registering the triggering event.

14. The system of claim 11, wherein the power source is a rechargeable power source and comprises a piezo element, and the rotational movement of the button is applied to the piezo element and generates piezoelectricity that is stored in the rechargeable power source.

15. The lock of claim 1, wherein the wireless transceiver is further configured to communicate in near real-time with one of: 1) a network device, 2) a control access server, and 3) an administrator device.

16. The lock of claim 15, further comprising a wireless modem configured to create a cellular broadband connection and communicate to an administrator device or a central access server in near real-time, and to create a short range wireless connection for communicating to an administrator device or a central access server in near real-time.

17. The lock of claim 16, wherein the lock is configured to receive an instruction from the central access server or the administrator device over the cellular broadband connection to block access to a user based on the user's biometric scan, passcode, or mobile device IMEI.

18. The lock of claim 16, wherein the lock is configured to:
   receive a token, a biometric scan or a passcode,
   transmit a request for access to the lock based on a set of configurable rules, and
   receive an instruction to grant or deny the request for access from the administrator device or central access server in near real-time.

19. The lock of claim 16, wherein the button comprises an inertial module configured to determine a door status that indicates whether a door has been opened or closed, and communicate the door status to the administrator device or central access server in near real-time, and wherein the lock is configured to determine a bolt status that indicates whether the bolt is in a locked or unlocked position, and communicate the bolt status to the administrator device or central access server in near real-time.

20. A system for controlling a lock having redundant access channels, the system comprising:
   the lock for providing redundant access channels according to claim 16; and
   a network device, wherein the lock is coupled to the network device over a short-range wireless connection, and the network device is coupled to the administrator device or central access server over a network connection.

* * * * *